(12) United States Patent
Sahu et al.

(10) Patent No.: US 11,734,157 B2
(45) Date of Patent: Aug. 22, 2023

(54) SYSTEMS WITH SOFTWARE ENGINES CONFIGURED FOR DETECTION OF HIGH IMPACT SCENARIOS WITH MACHINE LEARNING-BASED SIMULATION AND METHODS OF USE THEREOF

(71) Applicant: Virtualitics, Inc., Pasadena, CA (US)

(72) Inventors: Sarthak Sahu, Pasadena, CA (US); Ebube Chuba, Durham, NC (US); Anthony Pineci, Pasadena, CA (US); Aakash Indurkhya, Los Angeles, CA (US); Ciro Donalek, Pasadena, CA (US); Michael Amori, Pasadena, CA (US)

(73) Assignee: Virtualitics, Inc., Pasadena, CA (US)

( * ) Notice: Subject to any disclaimer, the term of this patent is extended or adjusted under 35 U.S.C. 154(b) by 0 days.

(21) Appl. No.: 17/980,978

(22) Filed: Nov. 4, 2022

(65) Prior Publication Data
US 2023/0205674 A1 Jun. 29, 2023

Related U.S. Application Data

(60) Provisional application No. 63/293,211, filed on Dec. 23, 2021.

(51) Int. Cl.
*G06F 9/44* (2018.01)
*G06F 9/455* (2018.01)
(Continued)

(52) U.S. Cl.
CPC ........ *G06F 11/3664* (2013.01); *G06N 20/00* (2019.01)

(58) Field of Classification Search
CPC .............. G06F 11/3664; G06N 20/00
See application file for complete search history.

(56) References Cited

U.S. PATENT DOCUMENTS 11,055,639 B1 7/2021 Cay et al.
11,354,564 B2 * 6/2022 Heinecke ............. G06N 3/0418
(Continued)

FOREIGN PATENT DOCUMENTS

EP 3872626 A1 * 9/2021 ........... G06F 40/284

OTHER PUBLICATIONS

Xinzheng Wang, Input Feature Selection Method Based on Feature Set Equivalence and Mutual Information, 2019, pp. 151525-151536. https://ieeexplore.ieee.org/stamp/stamp.jsp?tp=&arnumber=8873578 (Year: 2019).*

(Continued)

*Primary Examiner* — Mongbao Nguyen
(74) *Attorney, Agent, or Firm* — Greenberg Traurig, LLP

(57) ABSTRACT

Systems and methods are disclosed for scenario planning by using specially programmed software engines to simulate and detect particular feature variations leading to particular outcomes based on modeling with machine learning techniques. The disclosed technology enables improved model debugging, improved simulation efficiency and accuracy, improved model explainability, improved identification of high risk or high reward scenarios, among other improvements and combinations thereof. Computerized optimization techniques applied via variation generation across a dataset of test input records enable optimization for feature variation along with outcome variation. Moreover, the disclosed techniques may provide and/or realize a minimized variation to input data that correspond to a point of transition from one state to another state in an outcome that results from the input data, where the transition to another state is termed a "significant" variation to the output data.

14 Claims, 15 Drawing Sheets

(51) Int. Cl.
  *G06F 9/445* (2018.01)
  *G06F 11/36* (2006.01)
  *G06N 20/00* (2019.01)

(56) References Cited

U.S. PATENT DOCUMENTS

| | | | |
|---|---|---|---|
| 11,537,506 B1* | 12/2022 | Dasgupta | G06F 11/366 |
| 2004/0117040 A1 | 6/2004 | Sayyarrodsari et al. | |
| 2015/0379423 A1 | 12/2015 | Dirac et al. | |
| 2020/0175380 A1* | 6/2020 | Sturlaugson | G06F 11/0739 |
| 2021/0303436 A1* | 9/2021 | Bigaj | G06F 18/217 |
| 2022/0114461 A1* | 4/2022 | Moriyasu | G05B 13/0265 |
| 2022/0277859 A1* | 9/2022 | Alesiani | G16H 20/10 |
| 2022/0326922 A1* | 10/2022 | Lee | G06N 3/08 |
| 2022/0414492 A1* | 12/2022 | Jezewski | G06N 5/04 |

OTHER PUBLICATIONS

JobiLouis, Optimization techniques: Finding maxima and minima, 2018, pp. 5-15. https://www.datasciencecentral.com/optimization-techniques-finding-maxima-and-minima/ (Year: 2018).*
International Search Report and Written Opinion from International Appln. No. PCT/US22/48980 dated Feb. 16, 2023.

* cited by examiner

```
for age_value in range(start=17, stop=72, steps=15):
    for years_education_value in range(start=7, stop=18, steps=15):
        propose region(age > age_value, education > years_education_value)
        propose region(age > age_value, education < years_education_value)
        propose region(age < age_value, education > years_education_value)
        propose region(age < age_value, education < years_education_value)
```

FIG. 5C

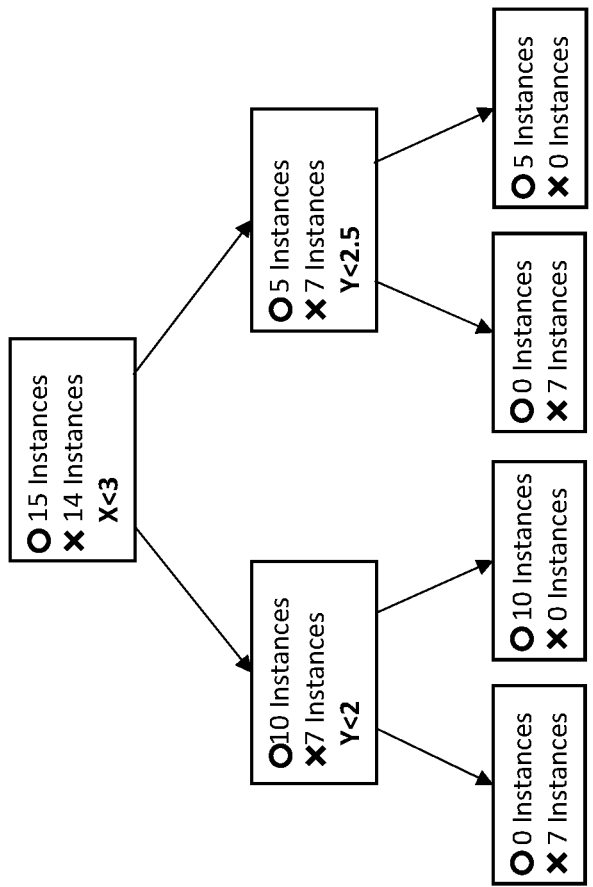
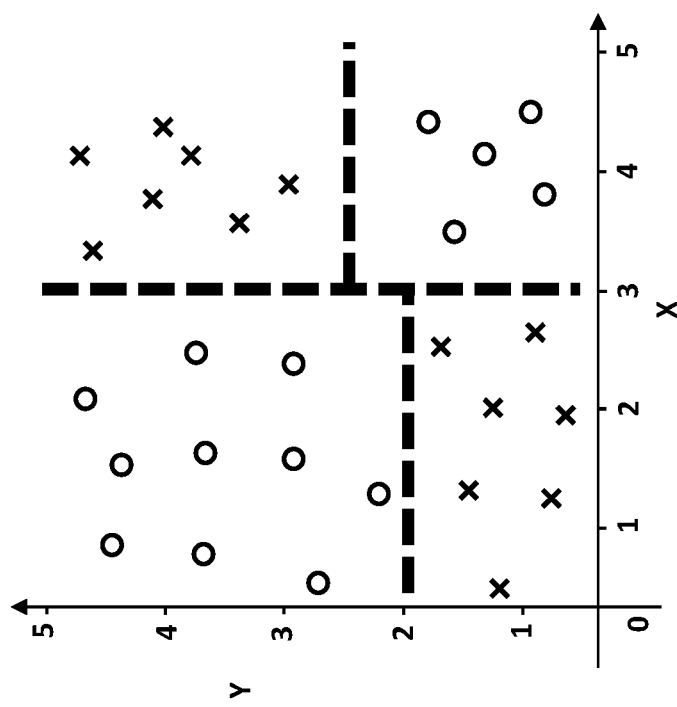
FIG. 6B
FIG. 6A

SYSTEMS WITH SOFTWARE ENGINES CONFIGURED FOR DETECTION OF HIGH IMPACT SCENARIOS WITH MACHINE LEARNING-BASED SIMULATION AND METHODS OF USE THEREOF

CROSS REFERENCE TO RELATED APPLICATIONS

This patent application claims the benefit of priority from U.S. Provisional Patent Application No. 63/293,211, filed Dec. 23, 2021, where the entirety of which is incorporated herein by reference

FIELD OF TECHNOLOGY

The present disclosure generally relates to systems employing specifically configured software engines for detection of high impact scenarios using machine learning-based simulation, including detection of particular feature variations leading to a maximized impact for particular outcomes based on simulating with machine learning techniques.

BACKGROUND OF TECHNOLOGY

Machine learning models are created through a training process that uses known outputs to calculate error in predictions based on corresponding inputs. The training process uses the error to update parameters and/or hyperparameters of the machine learning model being trained, resulting in a complex data structure that attempts to represent a relationship between an input and an output.

For advanced machine learning models, the identified relationship is inherently, to some degree, unexplainable or difficult to explain, even to the data scientist that architected and/or trained the machine learning model. As a result, there is limited ability to a priori construct scenarios having inputs that would result in a particular output or change to the output prior to modeling. Efforts to provide explainability for the machine learning model exist. Such efforts attempt to identify factors that influence particular results of the machine learning model, such as calculating the importance of each individual feature of the input or applying a surrogate model in parallel to the machine learning model. However, these techniques are inefficient and do not identify how variations to multiple inputs would change the result and do not identify what combination of input values might result in significant deviations or changes in the output values.

SUMMARY OF THE DISCLOSURE

According to some embodiments, described herein is an illustrative system for detection of high impact scenarios. The system includes at least one processor in communication with a non-transitory computer-readable medium having software instructions stored thereon, wherein, upon execution of the software instructions, the at least one processor is configured to: receive at least one input record; where the at least one input record includes a plurality of input features; iteratively generate at least one test input record including a variation to the plurality of input features of the at least one input record; iteratively determine an input variation metric indicative of a first degree of variation caused to the at least one input record by the variation to the plurality of input features; iteratively utilize a trained machine learning model to generate a at least one output record based at least in part on trained model parameters and the at least one test input record; iteratively determine, based on the at least one output record, an output variation metric indicative of a second degree of variation caused to the at least one output record by the variation to the at least one input record by the variation to the plurality of input features; iteratively store, in a variation database by the at least one processor: the variation to the plurality of input features, the input variation metric associated with the variation, the at least one output record, the output variation metric associated with the variation, and where the variation database includes: a plurality of preceding variations to the at least one input record, a plurality of preceding input variation metrics associated with the plurality of preceding variations and a plurality of preceding output variation metrics associated with the plurality of preceding variations; a plurality of preceding output records associated with the plurality of preceding output variation metrics; utilize an optimization problem to determine at least one candidate input feature of the plurality of input features based at least in part on the variation database; where the optimization problem is configured to determine the at least one candidate input feature of the plurality of input features that causes a maximized output variation in the at least one output record in response to a minimized input variation in the at least one input record; and instruct a computing device to present a graphical user interface indicating the at least one candidate input feature, the maximized output variation and the minimized input variation.

According to some embodiments, described herein is an illustrative method for detection of high impact scenarios. According to some embodiments, a method is disclosed, which includes: receiving, by at least one processor, at least one input record; where the at least one input record includes a plurality of input features; iteratively generating, by the at least one processor, at least one test input record including a variation to the plurality of input features of the at least one input record; iteratively determining, by the at least one processor, an input variation metric indicative of a first degree of variation caused to the at least one input record by the variation to the plurality of input features; iteratively utilizing, by the at least one processor, a trained machine learning model to generate a at least one output record based at least in part on trained model parameters and the at least one test input record; iteratively determining, by the at least one processor based on the at least one output record, an output variation metric indicative of a second degree of variation caused to the at least one output record by the variation to the at least one input record by the variation to the plurality of input features; iteratively storing, in a variation database by the at least one processor: the variation to the plurality of input features, the input variation metric associated with the variation, the at least one output record, the output variation metric associated with the variation, and where the variation database includes: a plurality of preceding variations to the at least one input record, a plurality of preceding input variation metrics associated with the plurality of preceding variations and a plurality of preceding output variation metrics associated with the plurality of preceding variations; a plurality of preceding output records associated with the plurality of preceding output variation metrics; utilizing, by the at least one processor, an optimization problem to determine at least one candidate input feature of the plurality of input features based at least in part on the variation database; where the optimization problem is configured to determine the at least one candidate input feature of the plurality of input features that causes a maximized output variation in the at least one output record in response to a minimized input variation in the at least one input record; and instructing, by the at least one processor, a computing device to present a graphical user interface indicating the at least one candidate input feature, the maximized output variation and the minimized input variation.

According to some embodiments, the one or more systems and/or methods for high impact scenario detection further include: iteratively generating, by the at least one processor, the variation to the plurality of input features of the at least one input record based at least in part on a predetermined variation step sequence; generating, by the at least one processor, a grid of the at least one test input record and the at least one output record; determining, by the at least one processor, the at least one candidate input feature based at least in part on the optimization problem; and where the optimization problem includes a grid search algorithm.

According to some embodiments, the one or more systems and/or methods for high impact scenario detection further include, where the grid search algorithm includes a heuristic search.

According to some embodiments, the one or more systems and/or methods for high impact scenario detection further include: iteratively determining with the optimization problem, by the at least one processor, an optimization metric based at least in part on the input variation metric associated with the variation, the output variation metric associated with the variation and an objective function; iteratively determining with the optimization problem, by the at least one processor, a next variation based at least in part on the optimization metric and the variation; and generating, by the at least one processor, a next test input record including the next variation to the plurality of input features of the at least one input record.

According to some embodiments, the one or more systems and/or methods for high impact scenario detection further include: iteratively determining with the optimization problem, by the at least one processor, the next variation based at least in part on a gradient descent.

According to some embodiments, the one or more systems and/or methods for high impact scenario detection further include, where the objective function includes minimax.

According to some embodiments, the one or more systems and/or methods for high impact scenario detection further include: utilizing, by the at least one processor, the optimization problem to determine an error associated with the at least one output record based at least in part on at least one target outcome; iteratively determining with the optimization problem, by the at least one processor, a next variation based at least in part on the error and the variation; and generating, by the at least one processor, a next test input record including the next variation to the plurality of input features of the at least one input record.

According to some embodiments, the one or more systems and/or methods for high impact scenario detection further include: receiving a dataset corresponding to the plurality of input features; analyzing the dataset, and defining, based on the analysis, a plurality of regions, each of the plurality of regions corresponding to a set of identified interval constraints on a subset of the plurality of input features; and performing region preprocessing on the defined plurality of regions, the preprocessing including modifying each of the plurality of regions to ensure a particular amount of information is defined within and outside the region.

According to some embodiments, the one or more systems and/or methods for high impact scenario detection further include, where the modification includes at least one of size filtering and region shrinking.

According to some embodiments, the one or more systems and/or methods for high impact scenario detection further include: performing, via the trained machine learning model, scenario simulation on the defined plurality of regions, the scenario simulation including manipulating points in and around the region based on a target variable; performing, based on the scenario simulation, a ranking aggregation, the ranking aggregation including a determination of a ranked order of the plurality of regions; and selecting a subset of the plurality of regions based on the ranked order, where the at least one candidate input feature, the maximized output variation and the minimized input variation are based on the selection.

BRIEF DESCRIPTION OF THE DRAWINGS

Various embodiments of the present disclosure may be further explained with reference to the attached drawings, where like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 5A-5C depict non-limiting examples of predictive model analysis performed in accordance with one or more embodiments of the present disclosure.

FIGS. 6A-6B depict non-limiting examples of region proposal analysis performed in accordance with one or more embodiments of the present disclosure.

DETAILED DESCRIPTION

Figure 1:
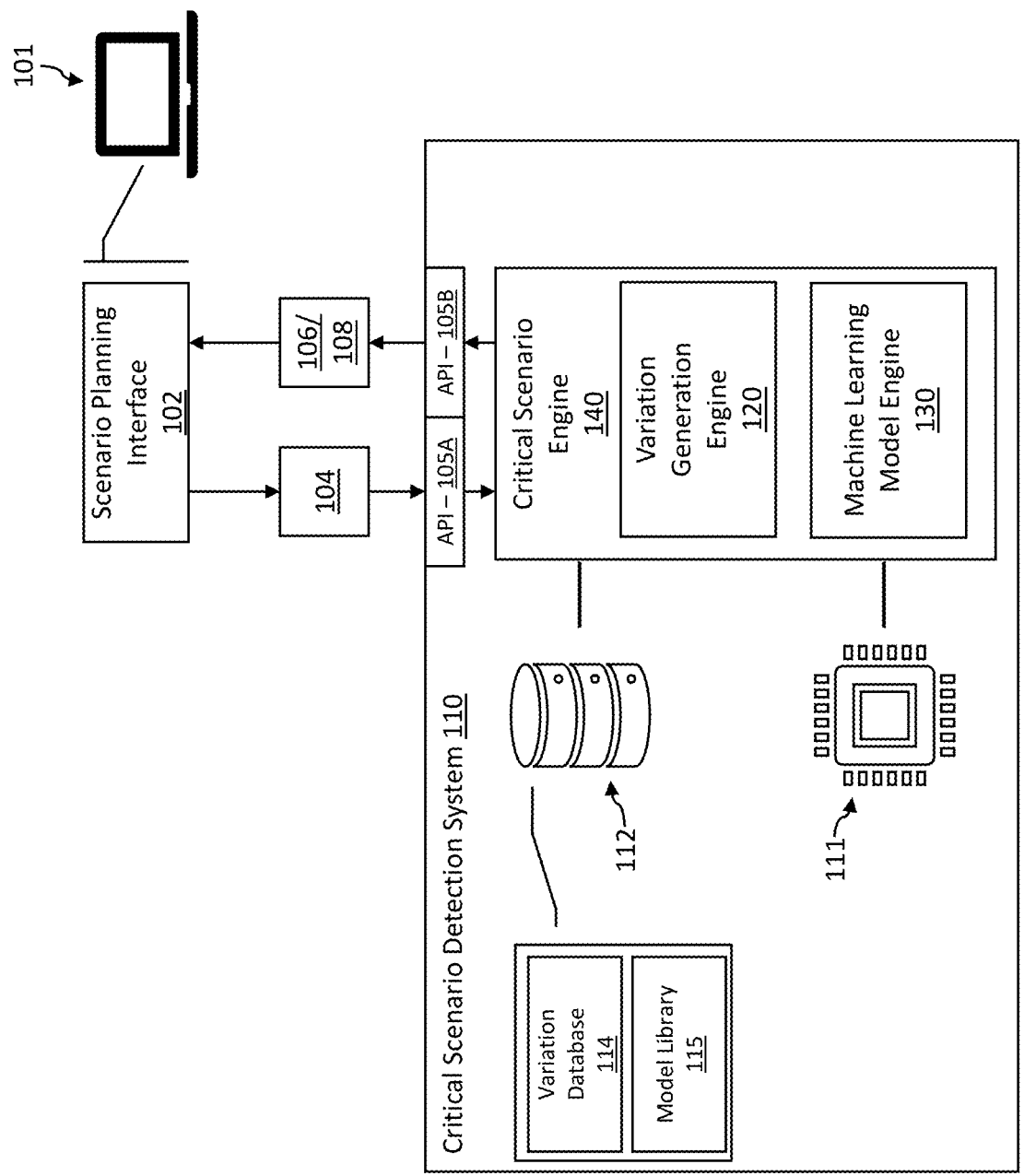
FIG. 1 is a block diagram of a computer-based system for simulating and recognizing scenarios of feature variation in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 7 illustrate systems and methods of scenario planning by using specially programmed software engines to simulate and detect particular feature variations leading to particular outcomes based on modeling with machine learning techniques. The following embodiments provide technical solutions and technical improvements that overcome technical problems, drawbacks and/or deficiencies in the technical fields involving machine learning prediction and/or modeling. As explained in more detail below, technical solutions and technical improvements herein include aspects of specially programmed software engines that enable improved model debugging, improved simulation efficiency and accuracy, improved model explainability, improved identification of high risk or high reward scenarios, among other improvements and combinations thereof. Herein, the term "explainability" and/or "model explainability" refers to the identification of factors or combinations of factors that influence particular results of an artificial intelligence (AI)/machine learning model.

One technical problem is that model explainability typically operates on a per instance (per data point) or per model basis. Additionally, determining a change to the instance that will change the outcome is limited to only explaining that specific data point. Accordingly, a technical solution presented herein provides whole dataset explainability that identifies a minimized set of changes that may be applied to an entire dataset (e.g., any and all data points) that will result in a maximized change to the outcome. As described below, this solution is achieved through the optimization techniques applied to variation generation across a dataset of test input records to optimize for feature variation along with outcome variation.

In some embodiments, high risk and/or high reward scenarios, also termed "critical scenarios," refer to one or more particular input data features and/or combinations of features that exhibit a minimized variation to input data that correspond to a point of transition from one state to another state in an outcome that results from the input data, where the transition to another state is termed a "significant" variation to the output data. For example, the states may be particular classifications produced by a classifier machine learning model, local minima and/or maxima produced by a regression machine learning model, or other change in states of the output data, including particular desired changes in states, such as target classifications or target values.

Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of a computer-based system for simulating and recognizing scenarios of feature variation in accordance with one or more embodiments of the present disclosure.

In some embodiments, a user may employ tools to develop insight into the behavior of a machine learning model, system, device, activity and/or data. Typically, the user would provide an instruction to a machine learning model to process an input record to develop a prediction based on features of the input record. To develop optimal characteristics (e.g., characteristics resulting in a particular desired behavior, classification, result, etc.), the user must perform trial and error, varying the features of the input record to discovery a configuration that achieves the desired behavior, classification, result, etc.

In some embodiments, a critical scenario detection system 110 may be employed to simulate multiple scenarios including variations to features of an input record in order to create a dataset of test input records such that particular technical steps may be employed to perform a detection and/or recognition process to detect a particular feature, variation to a feature, or combination of features and/or variations to features that may indicate optimal characteristics for achieving the desired behavior, classification, result, etc. across the dataset. Thus, the critical scenario detection system 110 provides added functionality to efficiently simulate scenarios including feature variations, thus enabling a user to ascertain a minimum variation to features that result in the maximum change to the output of the machine learning model.

Accordingly, in some embodiments, a user computing device 101 associated with the user may be configured to present a scenario planning interface 102 that enables the user to make selections and input information related to scenario planning. In some embodiments, the scenario planning interface 102 may include, e.g., interface elements for selecting an input record, an input record type, a machine learning task (e.g., classification, prediction, etc.), a target outcome (e.g., desired classification, target prediction thresholds, etc.), among other scenario parameters. In some embodiments, using the interface elements, the user may define the scenario for which the user wants to plan. Examples of machine learning tasks may include use cases involving the application of machine learning models such as, e.g., predictive maintenance, energy consumption, options book analysis, among other use cases.

An example application of machine learning is for doing predictive maintenance to predict, e.g., remaining useful life (RUL) of mechanical parts (e.g., commercial, personal and/or military aircraft engines, motor vehicle engines, valves, pumps, etc.), maintenance costs during a prediction period for mechanical parts, among other maintenance related predictions based on a variety of input variables including usage parameters and environmental conditions. A machine learning model for predictive maintenance may be trained on historical use data (e.g., historical flight data) including how the mechanical part has been used, under what environmental conditions the mechanical part has been used, and historical maintenance data, to learn the relationship between usage and failures. However, a machine learning model that predicts RUL, failures and/or maintenance costs, does not typically provide information on how to plan future use of mechanical parts to improve the RUL, failures and/or maintenance costs predictions. Similarly, a machine learning model that predicts RUL, failures and/or maintenance costs, does not typically provide information on critical risk scenarios that would lead to a deteriorated RUL, failure and/or maintenance cost prediction. Thus, the user may utilize the critical scenario detection system 110 to obtain critical scenarios according to a target outcome of a particular desired or undesired RUL, failure and/or maintenance cost prediction.

Another example of an application of machine learning would be to predict energy consumption in a metropolitan area based on a variety of input variables related to environment conditions and consumer behaviors. A machine learning model for prediction of energy consumption may be used by the energy company to ensure there is sufficient supply to meet demand for the region. However, there are many factors that could significantly impact the energy demand. The machine learning model that predicts energy consumption typically does not separately provide information on potential scenarios that would cause a spike in energy consumption. Thus, enabling the energy company to plan for scenarios that might lead to a significant spike in demand may enable adequate lead time to plan for such scenarios and have contingency plans in place should such events come to pass.

Another example of an application of machine learning may include to forecast stock and option prices. A machine learning model for forecasting stock and option price may include input variables pertaining to economic trends, social media, quarterly reports, etc. to formulate a prediction. Accordingly, simulation of scenarios may be used to identify critical scenarios that may cause a significant impact on the price of an equity.

In some embodiments, as a result of providing the scenario parameters into the scenario planning interface 102, the scenario planning interface 102 may produce a scenario request 104. In some embodiments, the scenario request 104 may include data representing the user's selections for the scenario parameters, including, e.g., respective data items for an input record (e.g., input variables), an input record type, a machine learning task (e.g., classification, prediction, etc.), a machine learning model (e.g., a trained machine learning model, a reference to a stored trained machine learning such as in model library 115, an untrained machine learning model, a reference to a stored untrained machine learning such as in the model library 115, or any combination thereof), training for training the machine learning model, test data for testing the machine learning model, metadata associated with the training data and/or test data, any other metadata, a target outcome (e.g., desired classification, target prediction thresholds, etc.), among other scenario parameters.

In some embodiments, the scenario request 104 may be communicated to the critical scenario detection system 110 via, e.g., a suitable application programming interface (API) 105A, messaging protocol, or other communication technology. In some embodiments, the scenario request 104 may be communicated across, e.g., a direct interface between the user computing device 101 and the critical scenario detection system 110 or across a network (such as a local area network (LAN), wide area network (WAN), Internet, intranet, or other network and combinations thereof), or a combination thereof. In some embodiments, the connection may include, e.g., hard wired connections (e.g., fiber optic cabling, coaxial cabling, copper wire cabling, ethernet, etc.), wireless connections (e.g., WiFi, Bluetooth, Zigbee, Z-Wave, cellular networking such as 5G, 4G, Long Term Evolution (LTE), 3G, High-Speed Downlink Packet Access (HSPA), Global System for Mobile Communications (GSM), Code-division multiple access (CDMA) or other technologies, and combinations thereof), or combination thereof.

In some embodiments, the API 105A may include a computing interface that defines interactions between multiple software intermediaries. The API 105A defines the kinds of calls or requests that may be made, how to make the calls, the data formats that should be used, the conventions to follow, among other requirements and constraints. The API 105A may be entirely custom, specific to a component, or designed based on an industry-standard to ensure interoperability to enable modular programming through information hiding, allowing users to use the interface independently of the implementation.

In some embodiments, the critical scenario detection system 110 may receive the data items of the scenario request 104 in order to simulate multiple scenarios and automatically identify an optimized scenario where a minimized variation to features of an input to the machine learning model results in a significant or maximized variation to the output of the machine learning model, where the features encode the input variables on which the machine learning model has been trained. In some embodiments, a significant variation may include a maximized variation to outputs resulting from a minimized variation to the features of an input record that results in, e.g., a maximized distance from a median coordinate of an input record dataset in a feature space, from a mean coordinate of the input record dataset in the feature space, a minimized variation to one or more features or combinations of features, a minimized sum or weighted sum of variations to each feature in each input record, or any other suitable metric for assessing minimized variations to the input record dataset.

In some embodiments, the critical scenario detection system 110 may be a part of the user computing device 101 or accessible over a network by the user computing device 101. For example, the critical scenario detection system 110 may be remote from the user computing device 101 and may provide software services or other functionality to the user computing device 101, e.g., via one or more cloud service(s), one or more server resources, or other remote provision of data and software functionality or any combination thereof. Thus, the critical scenario detection system 110 may include hardware and software components including, e.g., user computing device 101 hardware and software, cloud or server hardware and software, or a combination thereof.

In some embodiments, the critical scenario detection system 110 may include hardware components such as a processor 111, which may include local or remote processing components. In some embodiments, the processor 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 111 may include data-processing capacity provided by the microprocessor. In some embodiments, the microprocessor may include memory, processing, interface resources, controllers, and counters. In some embodiments, the microprocessor may also include one or more programs stored in memory.

Similarly, the critical scenario detection system 110 may include storage 112 for storing persistent data, such as, e.g., machine learning models in the model library 115, data entries defining variation simulations (e.g., input record, test input record, variation, variation metrics, output records, etc.) in a variation database 114, among other data. In some embodiments, the storage 112 may include, e.g., one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage 112 may include, e.g., a suitable non-transient computer readable medium such as, e.g., random access memory (RAM), read only memory (ROM), one or more buffers and/or caches, among other memory devices or any combination thereof.

In some embodiments, the critical scenario detection system 110 may implement computer engines for generating variations of features of an input record, model the input record with the variations of the features using a machine learning model, and optimize the variations to the features to achieve an objective (e.g., maximize a particular output, minimize a particular output, maximize the variations, minimize the variations, or any suitable combination thereof). In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the critical scenario detection system 110 may include a critical scenario engine 140 that utilizes a variation generation engine 120 and a machine learning model engine 130 to simulate input and output records, and identify critical scenarios based on the input and output records. As described above, herein, a critical scenario refers to one or more input feature values or range of values that drive a maximized and/or significant change in outcome as represented by the output records, such as a point of transition from one state of the outcome to another state of the outcome (e.g., a particular classification, value range, probability, local minimum, local maximum, distance in latent space, standard deviations, etc.).

In some embodiments, each engine may include dedicated and/or shared software components, hardware components, or a combination thereof. For example, one or more of the variation generation engine 120, the machine learning model engine 130 and the critical scenario engine 140 may include a dedicated processor and storage. However, in some embodiments, one or more of the variation generation engine 120, the machine learning model engine 130 and the critical scenario engine 140 may share hardware resources in any combination, including sharing the processor 111 and storage 112 of the critical scenario detection system 110 via, e.g., a bus or other suitable interfacing technology. In some embodiments, any combination of shared and/or dedicated resources may be applied to the variation generation engine 120, the machine learning model engine 130 and the critical scenario engine 140, e.g., in a particular server, across multiple servers, across nodes of a distributed processing system, across a cloud infrastructure (e.g., using one or more containers and/or virtual machines), or any other suitable computing resources in any suitable combination.

In some embodiments, upon receiving the scenario request 104, the critical scenario detection system 110 may provide the data items from the scenario request 104 to the critical scenario engine 140. In some embodiments, the critical scenario engine 140 may utilize the scenario request 104 to establish feature variation and machine learning modeling parameters. In some embodiments, the variation generation engine 120 may parse the data items of the scenario request 104 to identify the parameters including, e.g., intaking the data items and building a data structure, such as a parse tree, abstract syntax tree or other hierarchical structure, giving a structural representation of the input while checking for correct syntax to, e.g., produce a formatted data structure representing the scenario parameters.

In some embodiments, the critical scenario engine 140 may determine, from the data items of the scenario request 104, a machine learning model, an input record and features thereof, a target outcome or other parameters or any combination thereof. The scenarios tested for critical scenario detection may be defined by the features of an input record to the machine learning model. For example, a machine learning model for predictive maintenance of machinery and/or vehicles may take as input a feature vector representing input record variables relate to the use, condition, and environment of use of the machinery and/or vehicles (e.g., age, frequency of use, duration of use, maintenance history, time of year, temperature, humidity, etc.). Thus, each scenario in predictive maintenance may include a particular combination of feature values representing a particular set of circumstances for the use, condition, and environment of use of the machinery and/or vehicles. Other use cases may include energy consumption predictions based on scenarios including energy use variables (e.g., weather, time of year, energy use history, geographic location, etc.), equity price forecasting including equity pricing scenarios (e.g., price history, market segment, recent events, etc.), among other use cases and associated scenarios or any suitable combination thereof. Accordingly, the critical scenario engine 140 may determine from the scenario request 104 the use case, including, e.g., possible feature set and feature values, possible outcomes, machine learning model, and/or target outcomes (e.g., target class, target value, target range, target criteria, etc.). In some embodiments, target criteria may include, e.g., convergence or divergence criteria, threshold value for standard deviations a mean or median, local minima, local maxima, or other criteria or any combination thereof.

In some embodiments, based on the parameters including the use case, the critical scenario engine 140 may call or instantiate the variation generation engine 120 to generate a feature variation that varies one or more features of a set of feature values for each test input record of a set of test input records. In some embodiments, the variation generation engine 120 may create the simulated scenarios by producing variations to features of the test input records according to the possible feature set and feature values associated with the use case.

In some embodiments, the variation generation engine 120 may generate a feature variation based on the optimization technique of the critical scenario engine 140. In some embodiments, the critical scenario engine 140 may employ one or more optimization techniques to identify the critical scenario having the feature variation that results in the desired significant output variation according to the target outcome.

In some embodiments, the optimization technique may include a grid search. Accordingly, the variation generation engine 120 may use a grid generator to create test input records and populate a grid with the resulting output records and/or metrics thereof. In some embodiments, the variation may include a variation to one feature, to a combination of features or to all of the features. In some embodiments, the variation generation engine 120 may produce a set of test input records by iteratively applying a sequence of variations to the features of the input record, where each variation defines a new test input record. In some embodiments, each successive variation in the sequence of variations may be predefined according to, e.g., a step-wise sequence that steps first through a sequence of values of a feature and then the sequence of values through each successive feature, a step-wise sequence that steps first through a first value in the sequence of values for each feature and then through each feature with each successive value in the sequence of values, or any other suitable discrete set of variations to the features or any combination thereof.

In some embodiments, for example, a step-wise sequence of variations may include iteratively applying each variation in the sequence to a first feature of the feature set before iteratively applying each variation a next feature of the feature set. For example, a first variation may be applied to a first feature of the feature set by a predetermined increment, followed by a second variation to the first feature of the feature set by a predetermined increment to the first change, and so on until all available values to the first feature are stepped through, at which point the variation generation engine 120 may reset the first feature and step through changes to a second feature according to the predetermined increment.

In some embodiments, for example, a step-wise sequence of variations may include iteratively applying a first variation in the sequence to each feature of the feature set before iteratively applying successive variations in the sequence to each feature of the feature set. For example, a first variation may be applied to a first feature of the feature set by a predetermined increment, followed by first variation to a second feature of the feature set by a predetermined increment, and so on until all available features are stepped through, at which point the variation generation engine 120 may step through a second variation to each feature according to the predetermined increment.

In some embodiments, each variation may define a set of feature values of a unique test input record. In some embodiments, the variation generation engine 120 may generate a variation record in the variation database 114 that includes a particular variation and the associated test input record.

In some embodiments, the critical scenario engine 140 may employ an optimization function and/or explainable AI (XAI) technique. Thus, in some embodiments, the variation generation engine 120 may employ a rules engine configured to determine a next feature variation based on XAI rules, backpropagation, or other suitable technique for iteratively generating feature variations based on previous output records.

In some embodiments, based on the machine learning model determined from the scenario request 104, the critical scenario engine 140 may instantiate the machine learning model engine 130 to utilize the machine learning model. In some embodiments, the machine learning model engine 130 may identify and load a machine learning model in the model library 115 based on a reference, e.g., in the scenario request 104 and/or provided by the critical scenario engine 140. In some embodiments, the scenario request 104 may include a trained machine learning model for the critical scenario identification. Accordingly, the machine learning model engine 130 may load the machine learning model from the scenario request 104. Any other suitable technique for accessing and loading a machine learning may be employed.

In some embodiments, the machine learning model may include a specific trained machine learning model, a particular machine learning model architecture, a particular machine learning model type (e.g., convolutional neural network (CNN), recurrent neural network (RNN), autoencoder, support vector machine (SVM), etc.), or any other suitable definition of a machine learning model or any suitable combination thereof.

In some embodiments, the machine learning model engine 130 may be configured to utilize one or more AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, a neutral network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

define Neural Network architecture/model,
transfer the input data to the neural network model,
train the model incrementally,
determine the accuracy for a specific number of timesteps,
apply the trained model to process the newly-received input data,
optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, etc.) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

In some embodiments, upon loading the machine learning model, the machine learning model engine 130 iteratively ingest and process each test input record generated by the variation generation engine 120. In some embodiments, the machine learning model may form a classification label for each test input record, a numerical prediction for each test input record, or other suitable machine learning-based output. For example, a predictive maintenance machine learning model may include a classification model that generates a label indicating whether the RUL or maintenance costs are within a particular range. As another example, an energy consumption machine learning model may include a regression model that predicts an energy demand for a particular prediction period of time. As another example, an equity value machine learning model may include a regression model that predicts an equity price for a particular prediction period of time.

In some embodiments, each test input record may result in the machine learning model producing a particular output based on the variation to the feature set and the parameters of the machine learning model, e.g., trained parameters of a trained machine learning model associated with the scenario request 104. Accordingly, an output record may be identified as associated with the corresponding variation of the test input record. In some embodiments, the machine learning model engine 130 may, therefore, store the output record in the variation entry in the variation database 114 associated with the corresponding test input record.

Accordingly, in some embodiments, the variation database 114 may be used to store the variation entry along with each preceding and following variation entries including the associated preceding and following variation, test input record and output record.

In some embodiments, using each variation entry, the critical scenario engine 140 may implement an optimization problem to determine a variation candidate that achieves an optimal solution. In some embodiments, the optimal solution may be defined by a minimization of the variation, maximization of the variation, minimization of a variation on the output record, maximization of a variation of the output record, maximization of the output record varying from a target outcome, minimization of the output record varying from the target outcome, maximization of the output record varying toward the target outcome, minimization of the output record varying toward the target outcome, or any suitable combination thereof.

In some embodiments, the critical scenario engine 140 may receive or otherwise obtain the target outcome data item from the scenario request 104. In some embodiments, the critical scenario engine 140 may reference the target outcome based on, e.g., the input record, the input record type, the machine learning model, the machine learning task, or other scenario parameters associated with the scenario request 104. Accordingly, the critical scenario engine 140 may instantiate the optimization problem associated with the target outcome.

In some embodiments, for each variation entry, the critical scenario engine 140 may determine an input variation metric. In some embodiments, the input variation metric may include any suitable measure or value indicative of a degree of variation of the test input dataset, e.g., a numerical value encoding the variation (e.g., using one or more indices, a string of one or more numbers, a score, etc.), a statistical analysis of the variation relative to the preceding and following variations of preceding and following variation entries (e.g., a distance measure from an average and/or median, a standard deviation from an average and/or median, a regression from an average and/or median, or other suitable statistical metric or any combination thereof), a difference of the variation from an immediately preceding variation (e.g., a distance measure and/or vector, or other suitable difference), a statistical analysis of the test input records relative to other test input records of a test input record dataset (e.g., an average distance measure from an average and/or median, a standard deviation from an average and/or median, a regression from an average and/or median, or other suitable statistical metric or any combination thereof), a difference of the test input records from an immediately preceding test input records (e.g., an average distance measure or other suitable difference) or other suitable metric or any suitable combination thereof.

Similarly, for each variation entry, the critical scenario engine 140 may determine an output variation metric. In some embodiments, the output variation metric may include any suitable measure or value indicative of a degree of variation of the output record, e.g., a statistical analysis of the output records relative to other output records of an output record dataset (e.g., an average distance measure from an average and/or median, a standard deviation from an average and/or median, a regression from an average and/or median, or other suitable statistical metric or any combination thereof), a difference of the output records from an immediately preceding output records (e.g., an average distance measure, or other suitable difference) or other suitable metric or any suitable combination thereof.

In some embodiments, the critical scenario engine 140 may employ each test input record of the test input record dataset, each output record of the test output record dataset, each variation, each feature set, each input variation metric and/or each output variation metric to identify a critical scenario according to a minimized feature variation resulting in a significant transition in state of the output record given the target outcome.

In some embodiments, the critical scenario engine 140, for example, may employ a grid search technique to identify the critical scenario. As described above, for the grid search, the variation generation engine 120 may employ a grid generator to produce each feature variation.

In some embodiments, each feature variation and output record may be entered into a grid. The grid is a data structure that records entries for each test input record associated with each feature variation such that the dataset of test input records and the dataset of output records may be aggregated in order to facilitate a search for a critical scenario. In some embodiments, the grid may include a first dimension along which a test input record is defined according to feature values at each index along the first dimension. Additionally, the grid may include a second dimension along which variations to a particular feature across the test input record dataset are defined according to the feature values at each index along the second dimension. Accordingly, the index at the intersection of a particular location along the first dimension and particular location along the second dimension may define the feature value for a particular feature of a particular test input record. For example, the first dimension may be rows of a table where each row defines the features of a particular test input record, while the second dimension may be columns of the table where each column defines variations of a feature across test input records. Other arrangements of the grid may be employed, such as the first dimension being columns and the second dimension being rows, or any other suitable grid structure.

In some embodiments, the critical scenario engine 140 may append each output record to an associated test input record. In some embodiments, an output record may be added to the end or the beginning of the associated entry of the associated test input record for a particular feature variation. Alternatively, or in addition, the output records may be stored in a separate data structure.

In some embodiments, using the grid, the critical scenario engine 140 may perform a grid search to identify the critical scenario according to the target outcome. In some embodiments, the grid search may be a brute force search, which would be a relatively simple and reliable implementation. In some embodiments, the feature set of the input record may include a large number of features. The grid may include test input records for every combination of feature values, thus resulting a number of records that is an exponentially larger that the number of features, resulting in a resource intensive search if brute force is used. In some embodiments, to improve the efficiency, the grid search may employ a heuristic optimization. In some embodiments, the heuristic optimization may include initially testing every possibility against the target outcome at each step. The heuristic optimization may stop the search at any time if a current possibility is worse than a best solution already found. In such search problems, a heuristic may be used to try good choices first so that bad paths may be eliminated early (e.g., alpha-beta pruning). In some embodiments, the heuristics may include a best-case first algorithm, e.g., A* search, where the heuristic improves the algorithm's convergence while maintaining its correctness as long as the heuristic is admissible.

In some embodiments, the critical scenario engine 140 may alternatively or additionally employ an optimization function (e.g., loss function or reward function or both). In such embodiments, the optimization function may assess each output record according to the target outcome, the results of which may be provided to the variation generation engine 120 to determine a next feature variation to produce a next output record. In some embodiments, each feature variation may be generated according to the optimization function of the previous output record until the critical scenario is reached, e.g., as signaled by the target outcome.

In some embodiments, the optimization function may apply gradient descent to a differentiable machine learning model of the machine learning model engine 130 to determine new feature variations. In some embodiments, the optimization function may determine a gradient of the machine learning model and interactively determine which features of test input records generate the highest change in the output records with the fewest feature variations to the input record. In some embodiments, the optimization function may employ a suitable loss function, e.g., minimizing the sum of changes to the feature set, and optimize the feature variations according to the loss function using an optimization method, such as, e.g., projected gradient descent (PGD), Fast Gradient Sign Method (FGSM), stochastic gradient descent, batch gradient descent, mini-batch gradient descent, or other suitable gradient descent technique.

In some embodiments, the optimization function of the critical scenario engine 140 may be employed to instruct the variation generation engine 120 to generate optimized feature variations based directly on input variation metrics and output variation metrics. However, in some embodiments, the optimization function may be employed in an adversarial approach, where the loss function is defined as an error of the output record produced by the machine learning model relative to the target outcome based on the test input record. Using such a loss function, the critical scenario engine 140 may use the error of the output record and the optimization method to determine a minimal amount by which features may be moved and by how much to cause misclassification, e.g., away from the target outcome.

In some embodiments, additionally or alternatively, the critical scenario engine 140 may apply one or more explainable artificial intelligence (XAI) models to each test input record and associated output record. In some embodiments, the critical scenario engine 140 may utilize a trained explainer model to provide model explanation, such as, e.g., feature importances, counterfactual explanations, etc.

In some embodiments, the XAI model may generate a set of rules according to local explanations. In some embodiments, the local explanations may segment the solution space and generate explanations to less complex solution subspaces that are relevant for the whole model. These explanations may be formed by means of techniques with the differentiating property that these only explain part of the whole system's functioning. For example, the XAI model may include simplification that are based on rule extraction techniques such as, e.g., Local Interpretable Model-Agnostic Explanations (LIME), Gradient Input, Integrated Gradients, Layer-wise Relevance Propagation, Gradient-based Attribution, DeepLIFT, Guided Backpropagation, Deconvolution, Class Activation Map (CAM), saliency map, Concept Activation Vector (CAV), Deep Taylor decomposition, Shapley Additive Explanations (SHAP), counterfactual explanations, and/or all variations thereof. LIME, for example, builds locally linear models around the output records produced by the machine learning model of the machine learning model engine 130.

In some embodiments, the critical scenario engine 140 may use the XAI model to extract rules that link variations to features to changes in the output record. In some embodiments, the rules may be provided to the variation generation engine 120 to generate subsequent feature variations to alter the test input records in an explainable manner. Thus, upon the critical scenario engine 140 generating the input variation metric and output variation metric for each feature variation, the metrics may be provided to the variation generation engine 120 to determine the next feature variation based on the rules.

In some embodiments, based on the optimization problem (e.g., grid search, loss/reward function, adversarial neural networks, XAI model, etc.), the critical scenario engine 140 may generate a candidate variation and/or candidate input feature (hereinafter collectively referred to as "variation candidate 106") for which a minimized variation causes a significant output variation, e.g., a change from one state to another based on a target outcome. Rules defining type and extent of variation to particular features may then be defined based on the variation candidate 106, for example, by testing subsequent feature variations that conform to a potential rule based on the variation candidate 106. In some embodiments, rules may include, e.g., a deviation from a mean value for a feature, a value for a feature, a range of values for a feature, a range of deviations from a mean value for a feature, a difference in value between two or more features, a value or range of values of a particular feature conditional upon a value or range of values of another feature, among other rules or any combination thereof.

In some embodiments, a next feature variation may then be generated by the variation generation engine 120 and ingested by the machine learning model engine 130 to generate new output records. In some embodiments, based on the effect of the next feature variation on the output records, the critical scenario engine 140 may determine whether the transformation to the subset of features validate the rule. For example, the next feature variation may test that the values of the subset of features are each above a certain quantity, below a certain quantity, have a particular aggregate quantity or any other suitable rule that drives the maximal variation to the output.

In some embodiments, where a potential rule is validated, e.g., by testing the rule with the next feature variation and producing a variation candidate that matches the rule, the critical scenario engine 140 may output a critical scenario 108 and/or the variation candidate 106. In some embodiments, the critical scenario 108 may include, e.g., the validated rule, the values of each feature of the subset of features, or other representation of the critical scenario or any combination thereof.

In some embodiments, the critical scenario detection system 110 may provide the variation candidate 106 to the scenario planning interface 102, e.g., via API 105B. In some embodiments, the API 105B may be a same or different API from API 105A. In some embodiments, the API 105B may issue a call that includes data representing the variation candidate 106 and/or the critical scenario 108 and an instruction that causes the scenario planning interface 102 display the variation candidate 106 and/or the critical scenario 108 to the user. Accordingly, the user may be provided with conditions for a scenario including the variation candidate 106 that may achieve the target outcome even where the machine learning model used for generating the output records is black box model.

Figure 2:
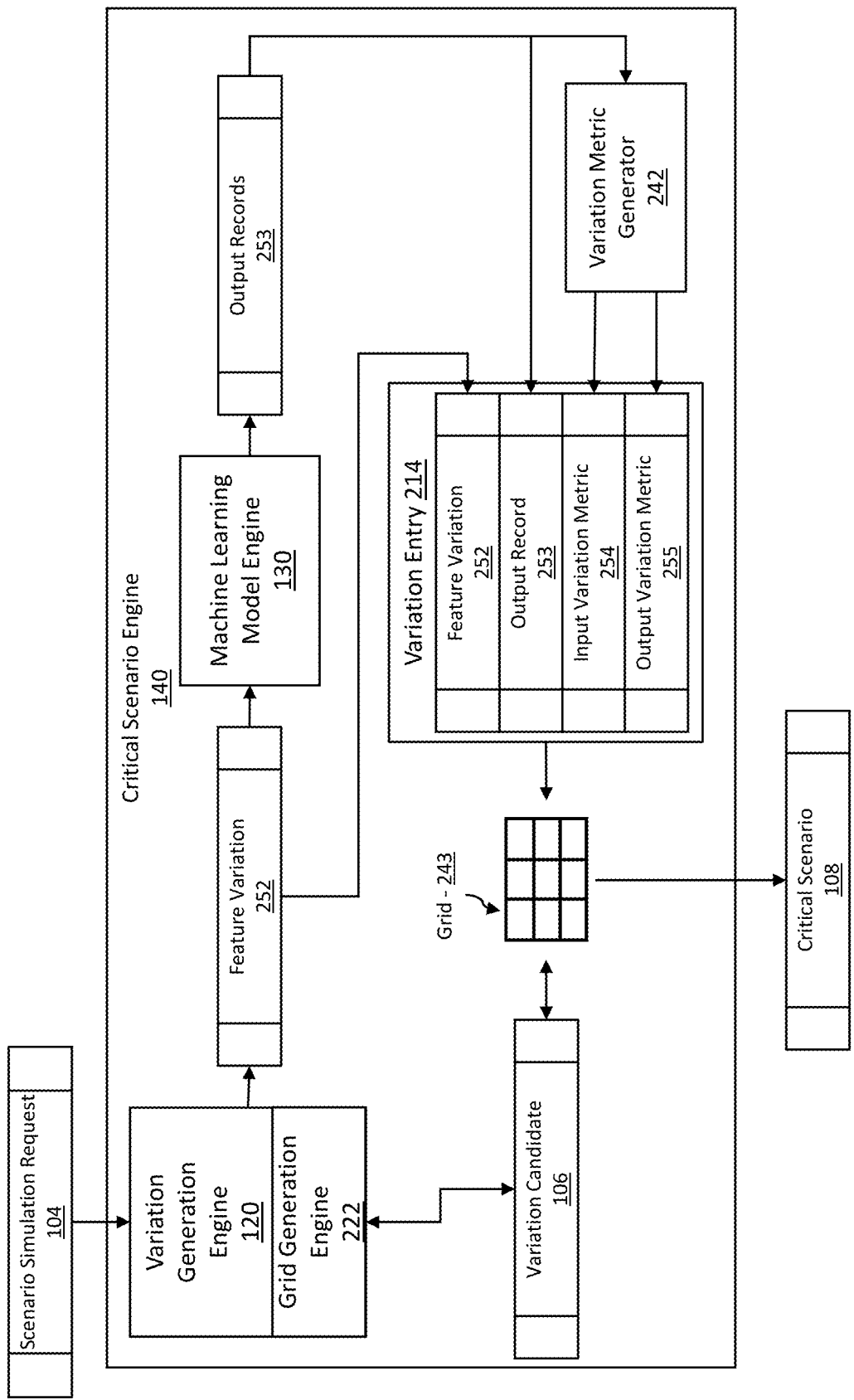
FIG. 2 is a block diagram of the scenario optimization engine configured to employ grid search for recognizing scenarios of feature variation in accordance with one or more embodiments of the present disclosure.

FIG. 2 is a block diagram of the scenario optimization engine configured to employ grid search for recognizing scenarios of feature variation in accordance with one or more embodiments of the present disclosure.

In some embodiments, the variation generation engine 120 may receive the scenario request 104 and generate a feature variation 252 defining a test input record according to a set of feature values based on the parameters identified in the scenario request 104. In some embodiments, the feature variation 252 may include a variation or change to one feature, to a combination of features or to all of the features. In some embodiments, the feature variation 252 may include an increment or decrement to a magnitude and/or value of at least one feature in the feature set of the scenario request 104. Accordingly, the feature variation 252 may define a test input record and/or a dataset of test input records produced according to the feature variation 252.

In some embodiments, the variation generation engine 120 may generate each feature variation 252 using a grid generation engine 222 based on a grid 243. In some embodiments, the grid generation engine 222 may be configured to determine a discrete set of variations to each feature value of each feature to create a set of unique test input records.

In some embodiments, the variation generation engine 120 may iteratively apply a sequence of variations to the features of an input record, where each variation defines a test input record. In some embodiments, each successive variation in the sequence of variations may be predefined according to, e.g., a step-wise sequence that steps first through a sequence of values of a feature and then the sequence of values through each successive feature, a step-wise sequence that steps first through a first value in the sequence of values for each feature and then through each feature with each successive value in the sequence of values.

In some embodiments, the machine learning model engine 130 may use a trained machine learning model to ingest and process the test input record having the feature variation 252. In some embodiments, the machine learning model may form a classification label for the test input record, a numerical prediction for the test input record, or other suitable machine learning-based output. In some embodiments, the test input record may result in the machine learning model producing a particular output based on the feature variation 252 to the feature set and the parameters of the machine learning model, e.g., trained parameters of a trained machine learning model associated with the scenario request 104. Accordingly, an output records 253 storing the output may be correlated to the feature variation 252 of the test input record.

In some embodiments, the critical scenario engine 140 may enter the output records 253 and the associated feature variation 252/test input record into a variation entry 214 in the variation database 114. In some embodiments, the critical scenario engine 140 may also implement a variation metric generator 242 to produce metrics related to the output records 253 and the feature variation 252/test input record. In some embodiments, the variation metric generator 242 may determine an input variation metric 254 and an output variation metric 255 as described above.

In some embodiments, the critical scenario engine 140, may populate the grid 243 according to the variation entry 214, including, e.g., appending to an entry in the grid data structure the output record 253, the input variation metric 254, the output variation metric 255 or any combination thereof. Thus, for each possible combination of values of the feature set, a value of the output records 253, the input variation metric 254, the output variation metric 255 or any combination thereof may be mapped in the grid 243.

In some embodiments, upon populating the grid 243 with the feature variation 252 and with the outcome from the machine learning model engine 130 (e.g., the output records 253, the input variation metric 254 and/or the output variation metric 255), the variation generation engine 120 may employ the grid generation engine 222 to produce a next feature variation 252. In some embodiments, the grid generation engine 222 may generate feature variation 252 in a discrete set of feature variations, e.g., according to parameters defining the discrete set of features variations. For example, the parameters may include a maximum and minimum value for each feature, and a step size for each feature. The grid generation engine 222 may then apply the parameters to generate all possible feature variations 252 defined by the parameters.

In some embodiments, using the grid 243, the critical scenario engine 140 may identify the critical scenario, e.g., according to the target outcome. In some embodiments, the critical scenario engine 140 may use a brute force search, testing each the feature variation 252 and the output records 253 in the grid 243 to identify the feature variation 252 or feature variations 252 that result in a minimized change to the test input records that produce a significant change in the outcome.

In some embodiments, as described above, to improve efficiency, the scenario request 104 may employ a heuristic search. In some embodiments, the heuristic search may include initially testing every possibility against the target outcome at each step. The heuristic search may stop the search at any time if a current possibility is worse than a best solution already found.

In some embodiments, the grid search algorithm may identify the location or locations of the grid that satisfy the target outcome (e.g., a minimized variation, maximized variation, minimized output variation, maximized output variation, or other suitable target outcome or combination thereof). By identifying the location or locations, the grid search algorithm may identify the associated feature(s) and/or feature variation(s) that satisfy the target outcome. For example, in some embodiments, variations of singular features in the grid 243 may be correlated to variations of the associated output records 253. Patterns in output records, such as changes of class, maximization of change, etc. may be identified based on the variations to each singular feature. The patterns may include, e.g., minima and/or maxima of each output record 253, maxima and/or minima of a derivative or rate of change of each output record 253, the output variation metric 255 of each output record 253, or any other suitable statistical analysis of the output records 253 or any combination thereof. In other examples, other analyses may be employed to determine singular and/or combinations of features that have values or ranges of values present within a critical scenario.

Accordingly, the grid search algorithm may produce the variation candidate 106 based on the results of the grid search. In some embodiments, the variation candidate 106 may be output as a critical scenario represented by the combination of features of the variation candidate that represents the minimized input variation that causes the maximized and/or target output.

In some embodiments, however, the variation candidate 106 may be used to identify rules to define the critical scenario. To do so, the variation generation engine 120 may receive the variation candidate 106 from the grid 243 and test a rule based on a transformation of the variation candidate 106. Thus, the grid generation engine 222 may modify the grid 243 to apply a particular transformation to one or more features in each entry of each test input record. For example, where the variation candidate 106 identifies a particular subset of features having particular values that represent the critical scenario, the grid generation engine 222 may generate one or more next feature variation(s) 252 that varies each feature in the particular subset of features by a predetermined amount or by an amount that is algorithmically determined. In some embodiments, the grid generation engine 222 may utilize the test input records and vary the values for the particular subset of features across the dataset of test input records in accordance with the variation candidate 106.

For example, the grid generation engine 222 may identify the particular values of the subset of features as a potential rule for a critical scenario. In such an example, the grid generation engine 222 may apply the particular values to the subset of features in each test input record to create the next feature variation 252.

In another example, the grid generation engine 222 may, for each feature in the subset of features, determine an input variation metric 254 including, e.g., a mean feature value across the test input records. In such an example, the grid generation engine 222 may then determine a difference between the value of each feature in the subset of features of the variation candidate 106 and the mean feature value for the respective feature across the test input records. In some embodiments, the grid generation engine 222 may then generate the next feature variation 252 as a change to the subset of features in each test input record based on the difference.

In some embodiments, any rule formulation or any combination thereof may be used to generate a next feature variation 252. The next feature variation(s) 252 may then be ingested by the machine learning model engine 130 to generation of new output records. In some embodiments, based on the effect of the next feature variation(s) 252 on the output records 253, the critical scenario engine 140 may determine whether the transformation to the subset of features validate the rule. For example, the next feature variation(s) 252 may test that the values of the subset of features are each above a certain quantity, below certain quantity, have a particular aggregate quantity or any other suitable rule that drives the maximal variation to the output.

In some embodiments, where a potential rule is validated, e.g., by testing the rule with the next feature variation 252 and producing a variation candidate 106 that matches the rule, the critical scenario engine 140 may output a critical scenario 108. In some embodiments, the critical scenario 108 may include, e.g., the validated rule, the values of each feature of the subset of features, or other representation of the critical scenario or any combination thereof.

Figure 3:
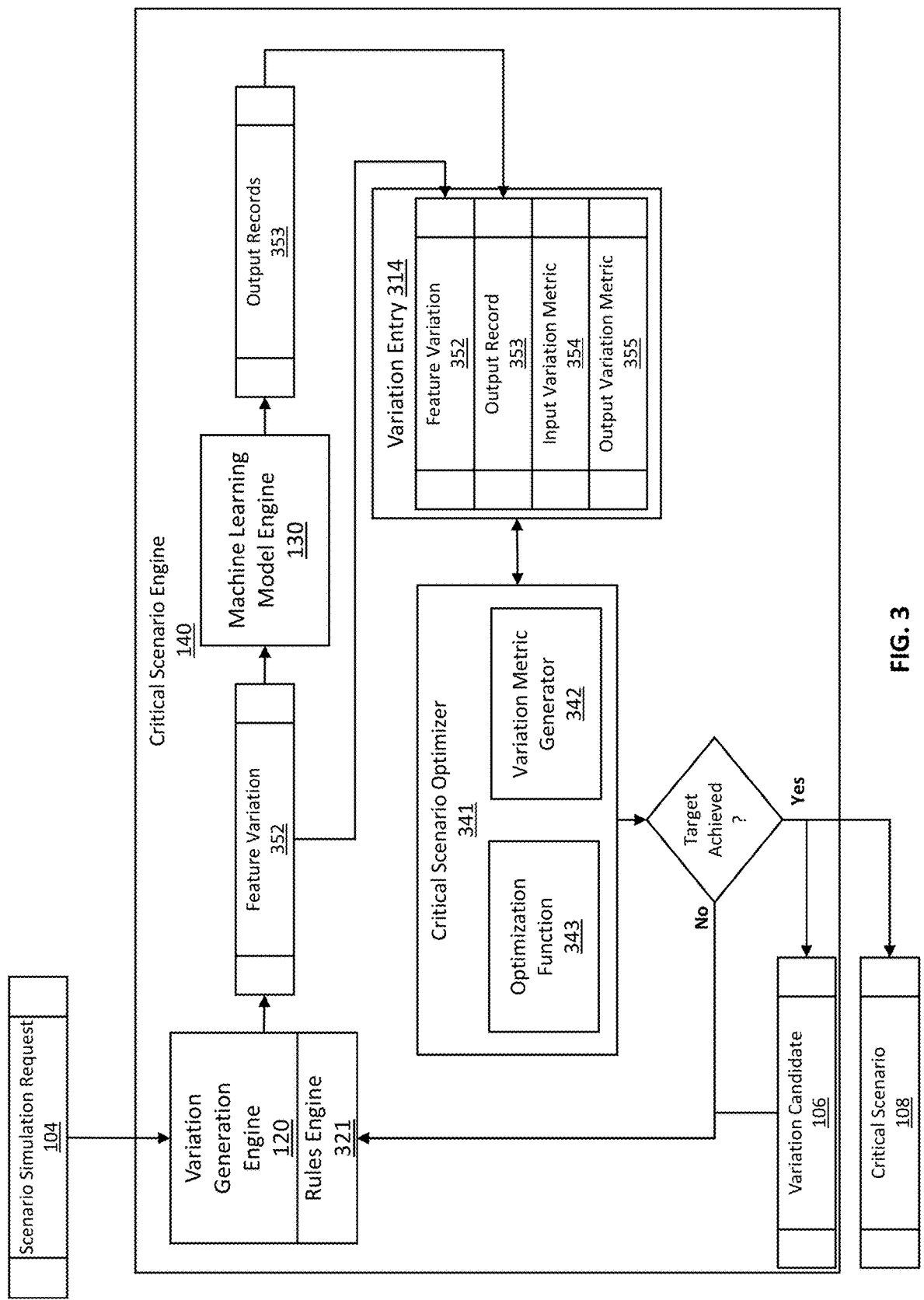
FIG. 3 is another block diagram of the scenario optimization engine configured to employ one or more optimization techniques for recognizing scenarios of feature variation in accordance with one or more embodiments of the present disclosure.

FIG. 3 is another block diagram of the scenario optimization engine configured to employ one or more optimization techniques for recognizing scenarios of feature variation in accordance with one or more embodiments of the present disclosure.

In some embodiments, upon receiving the scenario request 104, the variation generation engine 120 may use an initial input dataset to produce feature variations 352. In some embodiments, the initial input dataset may include an initial feature set having initial values for each feature associated with the input record. In some embodiments, the initial feature set may include, e.g., feature values selected by the user via the scenario planning interface 102, feature values of a current, real-world and/or measured scenario, a zero set where each feature value is set to zero, random values (e.g., determined by a random number generator, pseudorandom number generator, etc.), or other initialization of the features of the input record or any suitable combination thereof.

In some embodiments, the variation generation engine 120 may generate a feature variation 352 to the feature set. In some embodiments, the feature variation 352 may include a variation or change to one feature, to a combination of features or to all of the features. In some embodiments, the feature variation 352 may include an increment or decrement to a magnitude and/or value of at least one feature in the feature set of the input record. Accordingly, the feature variation 352 may define a test input record based on the resulting feature set.

In some embodiments, the machine learning model engine 130 may use a trained machine learning model to ingest and process the test input record having the feature variation 352 such as the machine learning model provided or referenced in the scenario request 104. Accordingly, an output records 353 storing the output may be correlated to the feature variation 352 of the test input record.

In some embodiments, the critical scenario engine 140 may enter the output records 353 and the associated feature variation 352/test input record into a variation entry 314 in the variation database 114.

In some embodiments, the critical scenario engine 140 may implement a critical scenario optimizer 341 having a variation metric generator 342 and an optimization function 343. In some embodiments, variation metric generator 342 may generate one or more metrics for each test input record defined by the feature variation 352 and for the output records 353. In some embodiments, variation metric generator 342 may also implement a variation metric generator 342 to produce metrics related to the output records 353 and the feature variation 352/test input record.

In some embodiments, the variation metric generator 342 may determine an input variation metric 354. In some embodiments, the input variation metric 354 may include, e.g., a numerical value encoding the feature variation 352 (e.g., using one or more indices, a string of one or more numbers, a score, etc.), a statistical analysis of the feature variation 352 relative to the preceding and following variations of preceding and following feature variations (e.g., a distance measure from an average and/or median, a standard deviation from an average and/or median, a regression from an average and/or median, or other suitable statistical metric or any combination thereof), a difference of the feature variation 352 from an immediately preceding feature variation (e.g., a distance measure and/or vector, or other suitable difference), a statistical analysis of the test input record relative to the preceding and following test input records of preceding and following feature variations (e.g., a distance measure from an average and/or median, a standard deviation from an average and/or median, a regression from an average and/or median, or other suitable statistical metric or any combination thereof), a difference of the test input record from an immediately preceding test input record (e.g., a distance measure and/or vector, or other suitable difference), a coordinate in a feature space of the test input record, a coordinate in a latent space of the test input record, or other suitable metric or any suitable combination thereof.

Similarly, the variation metric generator 342 may determine an output variation metric 355. In some embodiments, the output variation metric 355 may include, e.g., a statistical analysis of the output records 353 relative to the preceding and following output records of preceding and following feature variations (e.g., a distance measure from an average and/or median, a standard deviation from an average and/or median, a regression from an average and/or median, or other suitable statistical metric or any combination thereof), a difference of the output records 353 from an immediately preceding output record (e.g., a distance measure and/or vector, or other suitable difference), a coordinate in a feature space of the output records 353, a coordinate in a latent space of the output records 353, or other suitable metric or any suitable combination thereof.

In some embodiments, the optimization function 343 may use the variation entry 314, including the input variation metric 354 and/or the output variation metric 355, to determine a loss based on the output records 353 and the target outcome.

In some embodiments, based on the loss the critical scenario engine 140 may determine whether the target of the critical scenario has been achieved. For example, where a convergence for minimization of the feature variation and/or maximization of a variation in the output record is identified, the critical scenario engine 140 output the associated feature variation 352 as the variation candidate 106.

In some embodiments, where the target has not been achieved, the optimization function 343 provide the loss and/or the variation entry 314 to the variation generation engine 120 to determine a next feature variation 352. In some embodiments, the variation generation engine 120 may utilize a rules engine 321 to implement one or more rules driving a variation to one or more features of the initial input dataset.

In some embodiments, the rules engine 321 may include rules for implementing adversarial perturbation, whitebox optimization, counterfactual explanations, or other suitable optimization technique or any suitable combination thereof. To do so, the rules engine 321 may receive the variation candidate 106 from the critical scenario optimizer 341 and test a rule based on a transformation of the variation candidate 106. For example, the rules engine 321 apply a particular transformation to one or more features in each entry of each test input record to test a rule based on the variation candidate 106. Where the variation candidate 106 identifies a particular subset of features having particular values that represent the critical scenario, the rules engine 321 may generate one or more next feature variation(s) 352 that varies each feature in the particular subset of features by a predetermined amount or by an amount that is algorithmically determined. The next feature variation(s) 352 may then be ingested by the machine learning model engine 130 to generation of new output records.

In some embodiments, based on the effect of the next feature variation(s) 352 on the output records 353, the critical scenario engine 140 may determine whether the transformation to the subset of features validate the rule. For example, the next feature variation(s) 352 may test that the values of the subset of features are each above a certain quantity, below certain quantity, have a particular aggregate quantity or any other suitable rule that drives the maximal variation to the output.

Whitebox Optimization

In some embodiments, the critical scenario engine 140 may receive the output records 353 and implement an optimization problem according to a "whitebox" approach in order to determine a variation candidate 106 that achieves an optimal solution based on the output records 353 and the feature variation 352. As described above, in some embodiments, the optimal solution may be defined by a minimization of the feature variation 352, maximization of the feature variation 352, minimization of a variation on the output records 353, maximization of a variation of the output records 353, maximization of the output records 353 varying from a target outcome, minimization of the output records 353 varying from the target outcome, maximization of the output records 353 varying toward the target outcome, minimization of the output records 353 varying toward the target outcome, or any suitable combination thereof. Thus, the critical scenario engine 140 may optimize for a minimal change to an input dataset that results a maximized change in a resulting output dataset.

In some embodiments, the term "whitebox" optimization may refer to optimization that leverages visibility of the weights, parameters and/or hyperparameters of the machine learning model implemented by the machine learning model engine 130. The machine learning model including weights, parameters and/or hyperparameters may be visible as opposed to "hidden." Thus, the optimization problem may optimize the values of the features of the test input records based on the weights, parameters and/or hyperparameters of the machine learning model, for example, by determining a gradient of a differentiable model based on the weights, parameters and/or hyperparameters or by any other suitable evaluation of the machine learning model or any combination thereof.

In some embodiments, the critical scenario engine 140 may implement the optimization function 343 for optimizing the feature variation 352 to cause the machine learning model engine 130 to produce a variation in a dataset of output records. In some embodiments, the optimization function 343 may include a loss function configured to determine a loss based on the input variation metric 354 and the output variation metric 355. For example, in some embodiments, the optimization function 343 may compute a loss based on a minimization of the input variation metric 354 and a maximization of the output variation metric 355. Thus, the optimization function 343 may optimize for a target outcome of a minimized change to the input record dataset that results in a maximized change to outcome across the output record dataset (e.g., change of classification, etc.). Accordingly, the optimization function 343 may employ a loss function, such as, e.g., minimax, Hinge Loss, Multiclass SVM Loss, Cross Entropy Loss, Negative Log Likelihood, or other suitable loss function to determine the error of the output records 353 based on the target outcome.

In some embodiments, the loss computed by the optimization function 343 may be compared against the target, such as, e.g., a convergence on a minimization of the input variation and maximization of the output variation based on the variation entry 314 and/or previous variation entries 314. In some embodiments, the convergence on the target may include a convergence towards a local minimum or maximum in the loss to identity the feature or subset of features that result in the critical scenario.

In some embodiments, where the target is not met, the critical scenario optimizer 341 may return an instruction to the variation generation engine 120 to generate a next feature variation 352. In some embodiments, the instruction may cause the variation generation engine 120 to use the loss (and/or cost/reward) to implement a feature optimization approach to vary the features of the test input record to create a new test input record with a new feature variation 352. In some embodiments, the feature optimization approach of the variation generation engine 120 may include a suitable optimization method, such as, e.g., gradient descent or any suitable variation thereof, such as, e.g., projected gradient descent. By using a whitebox model, the feature optimization approach may determine a gradient based on the weights, parameters and/or hyperparameters of the machine learning model. For example, using a suitable gradient descent technique, the variation generation engine 120 may determine a direction and magnitude of descent (or ascent or combination thereof). The variation generation engine 120 may then apply the direction and magnitude of the descent to the dataset of test input records to create a next feature variation 352. In some embodiments, the machine learning model engine 130 may then create new output records 353 to by analyzed by the critical scenario optimizer 341.

Accordingly, the process may be repeated until the optimization function 343 determines that the feature variation converges on a minimum. The feature variation nearest the convergence may be identified and output as the variation candidate 106.

Adversarial Perturbation

In some embodiments, the critical scenario optimizer 341 may employ adversarial perturbation to optimize the feature variation 352. Similar to a whitebox optimization approach as described above, the adversarial perturbation approach may make use of an optimization function 343, but instead of or in addition to the whitebox insight into the weights, parameters and/or hyperparameters of the machine learning model, the optimization function 343 may instead optimize based on whether the feature variation 352 caused a particular change to the output records 353 (e.g., a change towards or away from a particular classification or prediction). Thus, in such an approach, a particular arrangement of models may be configured to generate new test records, produce an output record based on each new test record, and optimize the new test records to more successfully cause the machine learning model engine 130 to produce incorrect the output records (e.g., cause the machine learning model engine 130 to produce an output records 353 having a new outcome or state such as a new classification).

In some embodiments, the critical scenario engine 140 may implement the optimization function 343 for optimizing the feature variation 352 to cause the machine learning model engine 130 to produce a target result where, unlike in whitebox optimization which has a minimized input for maximized output target, the optimization function 343 may utilize a target of whether a different classification and/or prediction in the output records from the test input records. For example, the optimization function 343 may measure loss based on achieving a particular classification, avoid a particular classification, achieve a particular target value or value range, avoid a particular target value or value range, cause a maximized change to the outcome, or any other suitable criteria for the target outcome. In some embodiments, the optimization function 343 may include a loss function configured to determine a loss based on the input variation metric 354 and the output variation metric 355. For example, in some embodiments, the optimization function 343 may compute a loss based on a minimization of the input variation metric 354 and a maximization of the output variation metric 355. Thus, the optimization function 343 may optimize for the critical scenario of a minimized change to the input record dataset that results in the target outcome across the output record dataset (e.g., change of classification, etc.).

In some embodiments, the change in the outcome may include a targeted change or an untargeted change. A targeted change includes a change in the outcome that causes a new output having a particular criteria, e.g., a target classification, target range, or other target output. An untargeted change may include any change in the outcome across the output record dataset, e.g., any new e.g., a classification, range, or other output.

In some embodiments, the optimization function 343 may employ a loss function, such as, e.g., Hinge Loss, Multi-class SVM Loss, Cross Entropy Loss, Negative Log Likelihood, or other suitable loss function to determine the error of the output records 353 based on the target outcome. In some embodiments, the optimization function 343 may be combined with the whitebox optimization example described above to optimize using insight into the machine learning model as well as the adversarial approach.

In some embodiments, the critical scenario optimizer 341 may return the loss/cost/reward of the output records 353 to the rules engine 321 of the variation generation engine 120. In some embodiments, the rules engine 321 may implement a feature optimization approach to vary the features of the test input record to create a new test input record with a new feature variation 352. In some embodiments, the feature optimization approach of the rules engine 321 may include a suitable optimization method, such as, e.g., gradient descent or any suitable variation thereof, such as, e.g., projected gradient descent (PGD), Fast Gradient Sign Method (FGSM), stochastic gradient descent, batch gradient descent, mini-batch gradient descent, or other suitable gradient descent technique. Accordingly, the rules engine 321 may determine a next feature variation based on the gradient, where the next step is in the direction opposite the gradient towards a minimum. The process may be repeated until the optimization function 343 determines that the feature variation converges on a solution including a minimum feature variation that causes the change in outcome. The feature variation nearest the convergence may be identified and output as the variation candidate 106.

In some embodiments, the optimization function 343 may operate on a particular feature of the test input records to identify a minimized change to the particular feature that results in the target outcome. The critical scenario engine 140 may iterate through each feature to identify the minimized change to each feature to create the target outcome, thus defining a critical scenario with respect to each feature.

In some embodiments, the optimization function 343 may employ the input variation metrics 354 and output variation metrics 355 and/or the optimization function 343 may employ one or more techniques to minimize change to a combination of features or to all features to create the target outcome. Thus, the critical scenario engine 140 may iterate through perturbations to combinations of features to create the target outcome, thus defining the critical scenario with respect to the combination (e.g., a particular combination of values for each feature in the combination).

XAI Rules

In some embodiments, the critical scenario engine 140 may utilize an optimization function 343 for counterfactual discovery. In some embodiments, the critical scenario engine 140 may access an XAI model having trained parameters for determining local explanations. In some embodiments, the XAI model may be provided in the scenario request 104, or may be obtained, e.g., in the model library 115, via a reference provided in the scenario request 104. In some embodiments, the reference may include a data item specifying the XAI model or may be an associated with the machine learning model used to predict the output records for the use case of the scenario request 104. Any other suitable method for specifying and providing a trained XAI model may be employed or any combination thereof. Any suitable XAI models that generate local explanations according to local populations of a dataset may be employed, such as, e.g., SHAP, LIME, counterfactual explanations or others or any combination thereof.

In some embodiments, the critical scenario engine 140 may load the local explanations into the rules engine 321 of the variation generation engine 120. In some embodiments, the rules engine 321 may use the local explanations to generate a set of rules defining counter-examples or counterfactual explanations of the local explanations. Such, rules may each define a variation to one or more features that cause a change to the output.

In some embodiments, in order to determine the variations that have a significant impact, e.g., the variations that cause a change to the state of the output dataset, the variation generation engine 120 may generate feature variations 352 based on the rules. Each feature variation 352 may be provided to the machine learning model engine 130 for modeling to produce an output records 353.

In some embodiments, the variation metric generator 342 may determine an input variation metric 354 as described above. Similarly, the variation metric generator 342 may determine an output variation metric 355 as described above.

In some embodiments, the critical scenario engine 140 may implement the optimization function 343 for optimizing the feature variation 352 to cause the machine learning model engine 130 to produce a different result, e.g., to achieve a different or target outcome from the initial input dataset. In some embodiments, the optimization function 343 may include a loss function configured to determine a loss based on the input variation metric 354 and the output variation metric 355. For example, in some embodiments, the optimization function 343 may compute a loss based on a minimization of the input variation metric 354 and a maximization of the output variation metric 355. Thus, the optimization function 343 may optimize for a target outcome of a minimized change to the input record dataset that results in the change to outcome across the output record dataset (e.g., change of classification, etc.). In some embodiments, the optimization function 343 may employ a loss function, such as, e.g., Hinge Loss, Multi-class SVM Loss, Cross Entropy Loss, Negative Log Likelihood, or other suitable loss function to determine the error of the output records 353 based on the target outcome.

In some embodiments, the critical scenario optimizer 341 may return an instruction to the rules engine 321 to apply a next rule for a next feature variation 352. The process may be repeated until the optimization function 343 determines that the feature variation converges on a target including a minimum feature variation that causes the maximized change in outcome. The feature variation nearest the convergence may be identified and output as the variation candidate 106.

Figure 4:
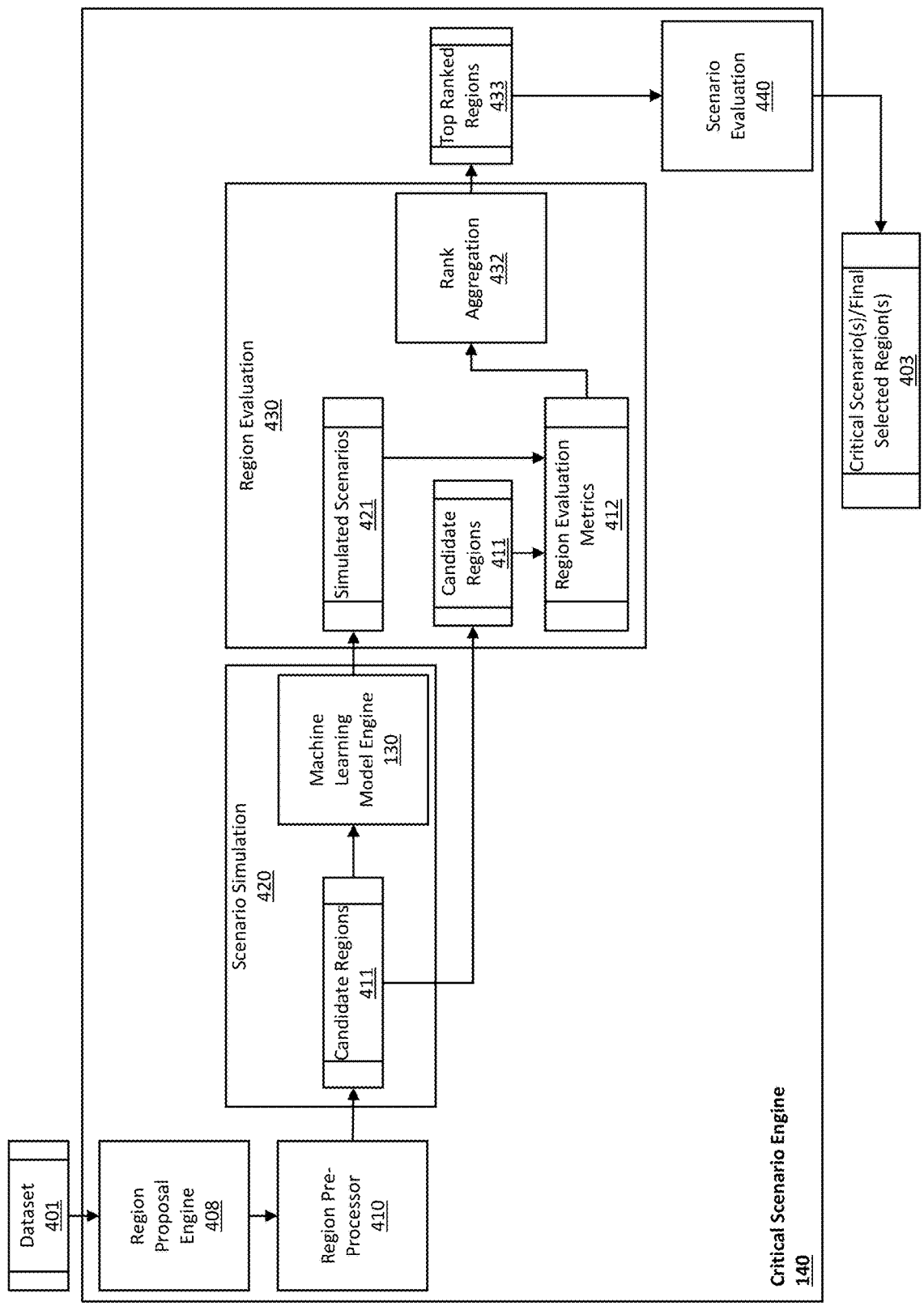
FIG. 4 is a block diagram of a critical scenario engine configured to simulate input and output records, and identify critical scenarios based on the input and output records in accordance with one or more embodiments of the present disclosure.

Turning to FIG. 4, depicted are non-limiting example embodiments for processing by the critical scenario engine 140. As described above, a critical scenario refers to one or more input feature values or range of values that drive a maximized and/or significant change in outcome as represented by the output records, such as a point of transition from one state of the outcome to another state of the outcome (e.g., a particular classification, value range, probability, local minimum, local maximum, distance in latent space, standard deviations, etc.).

According to some embodiments, implementation and functionality of critical scenario engine 140 may include, but is not limited to, establishing feature variation and machine learning parameters, as discussed above at least in relation to FIG. 1.

According to some embodiments, as illustrated in FIG. 4 and discussed herein, critical scenario engine 140 may include, but is not limited to, a region proposal engine 408, region pre-processor 410, a component for scenario simulation 420, a component for region evaluation 430, a component for top ranked regions 433 and a component for scenario evaluation 440. In some embodiments, scenario simulation 420 may include a component for candidate regions 411 and a component for machine learning model 130. In some embodiments, region evaluation 430 may include a component for simulated scenarios 421, a component for candidate regions 411, a component for region evaluation metrics and a component for rank aggregation 432. Engine 140 may receive information related to dataset 401, and provide output data related to critical scenario(s)/final selected region(s) 403, as discussed herein.

In some embodiments, as discussed herein, the critical scenario engine 140 may determine, from dataset 401 (e.g., data items of the scenario request 104), a machine learning model (e.g., for use via region proposal engine 408), an input record and features thereof, a target outcome or other parameters or any combination thereof.

According to some embodiments, as discussed above, the scenarios tested for critical scenario detection may be defined by the features of an input record to the machine learning model. Thus, the critical scenario engine 140 may determine from the dataset 401 the use case, including, e.g., possible feature set and feature values, possible outcomes, machine learning model, and/or target outcomes (e.g., target class, target value, target range, target criteria, etc.). In some embodiments, target criteria may include, e.g., convergence or divergence criteria, threshold value for standard deviations a mean or median, local minima, local maxima, or other criteria or any combination thereof.

According to some embodiments, engine 140 may receive dataset 401, via the region proposal engine 408. Engine 408 may perform operations to analyze information related to, but not limited to, the dataset 401, information related to the dataset 401 (e.g., source of the data, format, quantity, volume, and the like), timing and location related to the dataset 401, and the like, or some combination thereof. Accordingly, in some embodiments, engine 408 may perform processing of region proposal according to any of the know or to be known machine learning models discussed above.

Figure 5A:
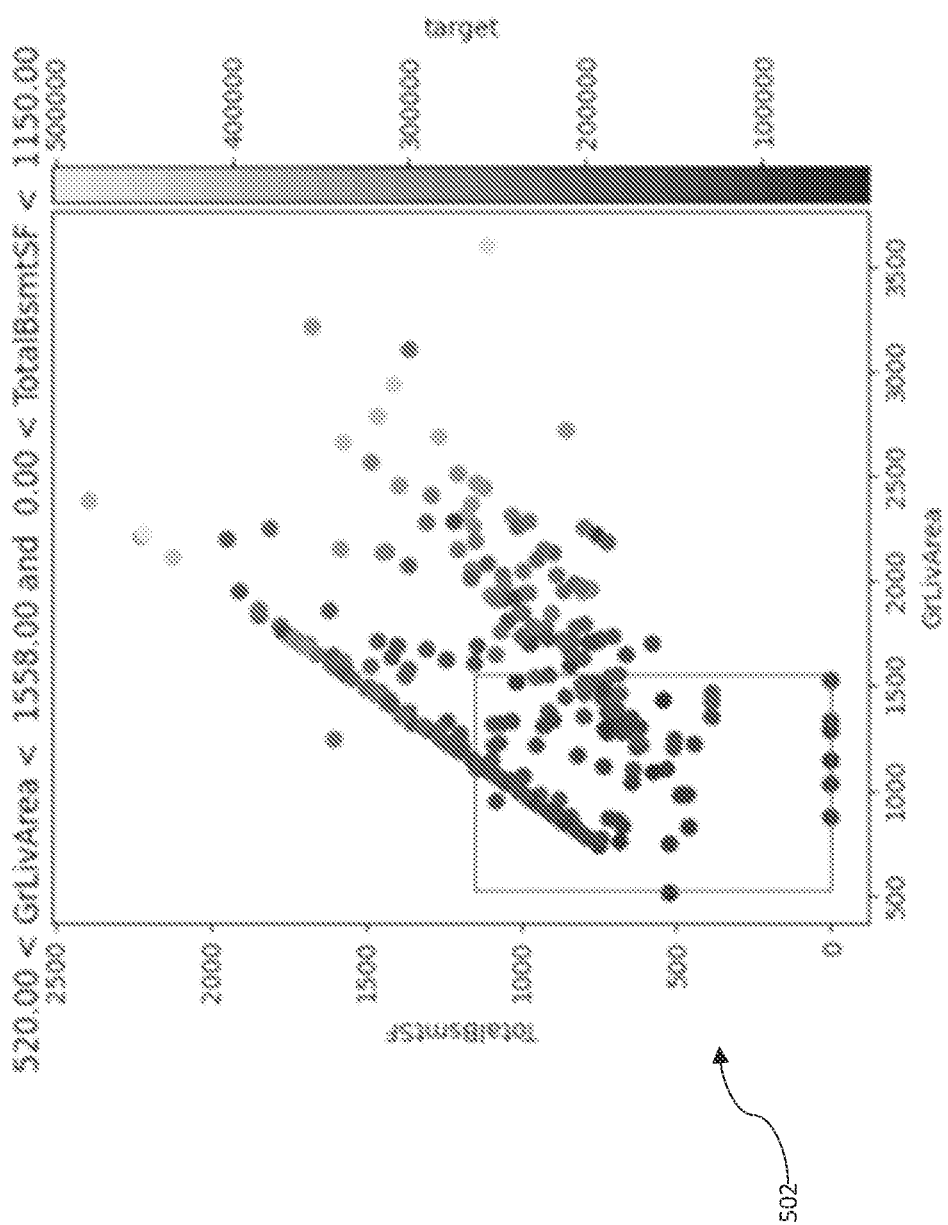

In some embodiments, region proposal engine 408 performs operations for determining and prosing a set of candidate regions. For example, as illustrated in FIG. 5A, item 502 may be a proposed region, which may be a set of interval constraints on a small subset of all the features from dataset 401. In some embodiments, for example, a region 502 may be a multidimensional bounding box in feature space. For example, as illustrated in FIG. 5A: region 502 may be defined as a feature subspace where 520.00<GrLivArea<1558.00 and 0.00<TotalBsmtSF<1150.00. This, for example, may represent a "scenario" that may occur.

By way of another non-limiting example, for features related to "Age" and "Income", a region may be defined as the feature subspace where 18<"Age"<30 and 1000<"Income"<5000. Similar to the above example, this, for example, may represent a "scenario" that may occur.

According to some embodiments, region proposal engine 408 may execute a method to determine a candidate region (e.g., region 502 of FIG. 5A). For example, engine 408 may perform a decision tree method, brute force search or clustering method.

According to some embodiments, a decision tree method may be utilized, which may involve the training of a surrogate decision tree model on data from dataset 401, which may then be used to identify decision boundaries as candidate regions. In some embodiments, in order to obtain larger variety of candidate regions, engine 408 may utilize trained random forest models, which may be leveraged to obtain regions from each individual tree in an ensemble of trees (e.g., which may be trained on a randomized subset of features/data).

Figure 5B:
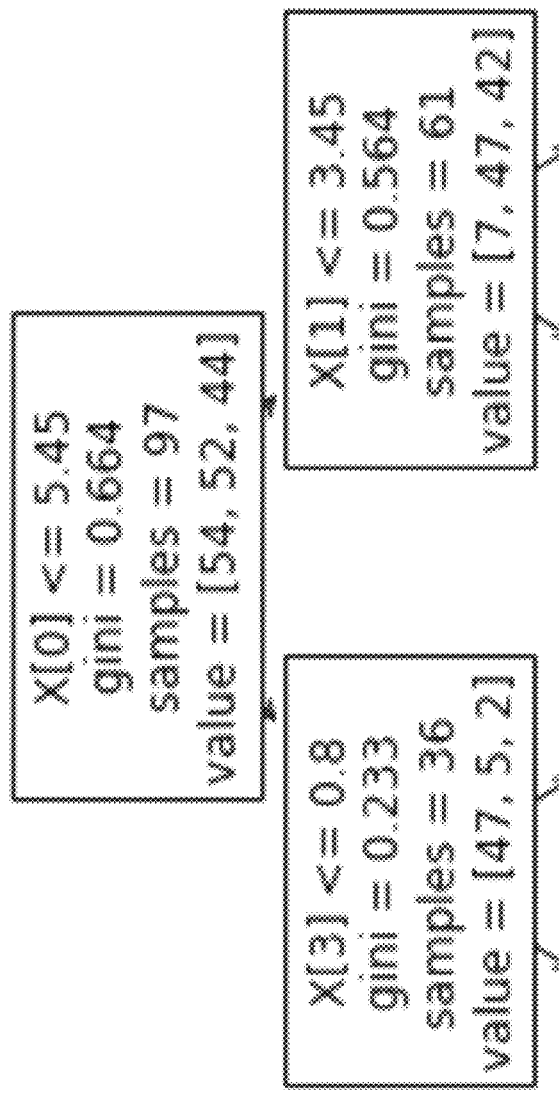

By way of a non-limiting example, as illustrated in FIG. 5B, a depth of 2 trees are disclosed, which are used to identify regions, as discussed herein. For example, the depiction in FIG. 5B may produce two candidate regions: [X[0]<=5.45, X[3]<=0.8] and [X[0]<=5.45, X[1]<=3.45]. In some embodiments, a maximum dimensionality of the candidate regions may be changed by adjusting the max depth of the trees. For example, with depth 3 trees, 3D regions may be capable of being produced.

According to some embodiments, if a region is defined by [X[0]<=1, X[4]>=3.22], X[0] may be a single column of a one-hot encoded categorical feature. In some embodiments, X[0] may correspond to a one hot encoded feature called "Color", where X[0] represents the color "Green". Then if X[0]<=1, the region axis may be considered to be "Color" !="Green", and if X[0]>0, then the axis may be "Color"="Green".

Turning to FIGS. 6A-6B, a modelling of points via a random forest model for delineation by individual decision trees is depicted. Thus, FIGS. 6A-6B provide an illustrate, non-limiting example of decision tree modelling according to some embodiments of the instant disclosure.

Turning back to FIG. 4, in some embodiments, engine 408 may employ a brute force search. In some embodiments, this may be similar to a grid search, where an interval of values along each feature may be established, and then tested out for combinations of pairs of features. In some embodiments, for each continuous feature, a predetermined number of equally spaced values between the min and max of the feature values (e.g., 15, for example), and for each categorical feature, each unique category may be checked. In some embodiments, engine 408 may iterate through all or a set of possible combinations of pairs of features and values. For each combination of a feature and value, engine 408 may check both> and <operators in the case of continuous features, or just=in the case of categorical features.

By way of a non-limiting example, engine 408 is searching through the features "Age" and "Years of Education", where "Age" takes on values between 17 and 72, and "Years of Education" takes on values between 7 and 18. In some embodiments, one or more categorical variables may be utilized. For example, an "Occupation" may be a categorical variable. In some embodiments, a categorical variable(s) may be included as a searched feature by engine 408. Engine 408 may examine, evaluate and/or attempt a predetermined number (e.g., a set, portion or all) of every pair of features, and for a pair, for example "Age" and "Years of Education". An example of how this may be configured is depicted in FIG. 5C.

In some embodiments, engine 408 may employ a clustering methodology. According to some embodiments, engine 408 may execute a clustering algorithm on dataset 401 (e.g., KMeans, HDB Scan, for example), where each identified cluster is considered a region. In some embodiments, a smallest possible box encompassing a predetermined number of points in a cluster may be considered a region. In some embodiments, clustering may be flexible in shape and in dimensionality.

Turning back to FIG. 4, upon region proposal engine 400 executing its configured operations, as discussed above, the output is passed to region pre-processor 410. According to some embodiments, region pre-processor 410 may perform, but is not limited to, size filtering and region shrinking.

In some embodiments, region pre-processor 410 may perform size filtering by executing a filtering operation to remove regions that have too little points or too little points outside of a region. For example, region pre-processor 410 may analyze each region and determine whether the points inside and/or outside the region satisfy a threshold value (e.g., 10 points).

Figure 7:
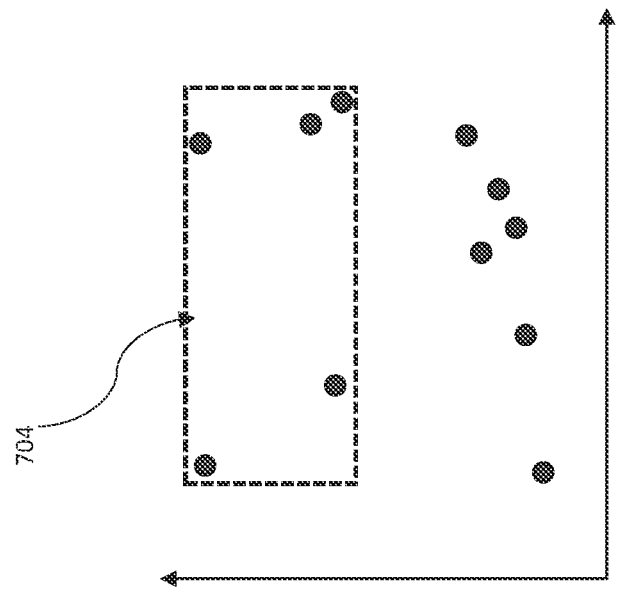
FIG. 7 depicts a non-limiting example of region preprocessing performed in accordance with one or more embodiments of the present disclosure.
Figure 7:
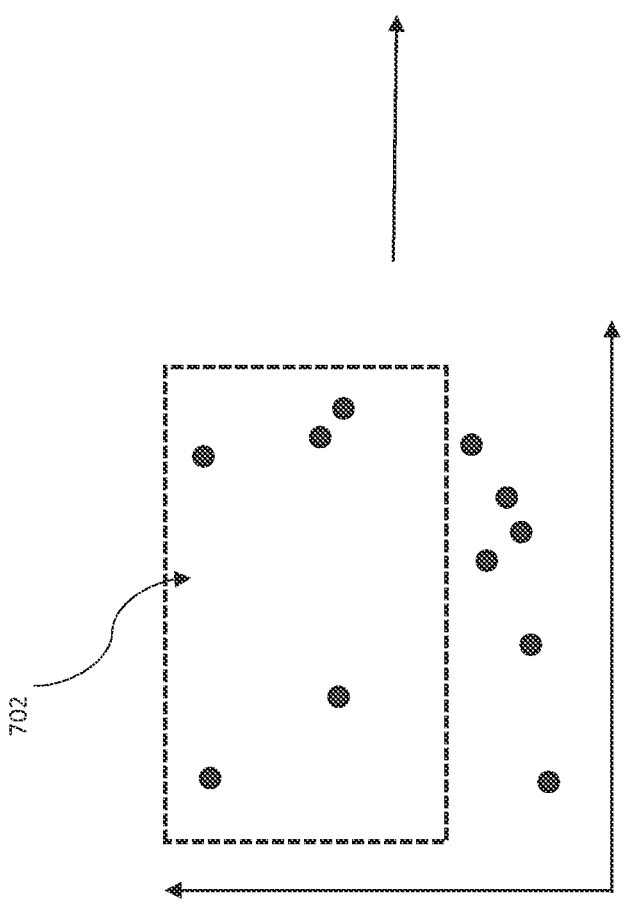

In some embodiments, region pre-processor 410 may perform region shrinking. This enables regions to match or be substantially similar to available data (e.g., dataset 401). Thus, in some embodiments, region pre-processor 410 may perform operations to shrink a proposed region (from engine 408) to the extent of the data within it. For example, for a region with "Age">3, if the available data only contains points with 5<"Age"<20, the region would be shrunk to fit 5<"Age"<20. FIG. 7 depicts an example of region shrinking where region 702 is modified to shrink in size, as identified in region 704.

In some embodiments, the output of the region pre-processor 410 is passed to the component for scenario simulation 420 of engine 140. Scenario simulation 420 may be performed to achieve an accurate estimate of a scenario in line with and/or based on a target variable (and/or the target variable's value, which may be based on training dataset values). As mentioned above, scenarios simulation 420 may receive as input candidate regions 411 (e.g., output from region pre-processor 410) and input them into machine learning model engine 130, which performs the operations discussed above in relation to at least FIGS. 1-3.

Figure 8:
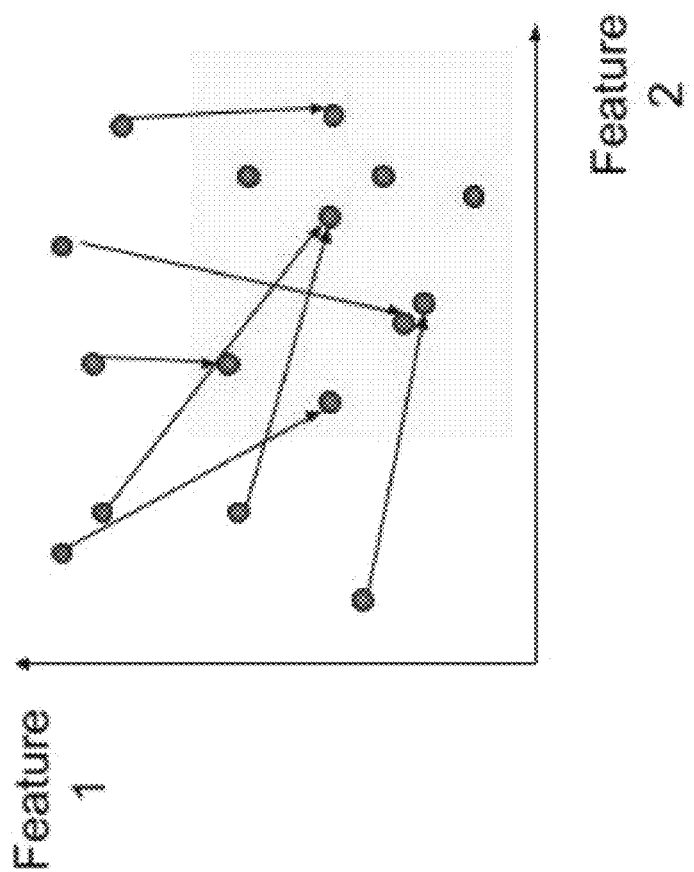
FIG. 8 depicts a non-limiting example of a simulation performed in accordance with one or more embodiments of the present disclosure.

According to some embodiments, to simulate a scenario 420, engine 140 may move all or some of the points outside of the region inside the region. An example of this is depicted in FIG. 8. In some embodiments, to preserve the original features of the data point, only the features considered outside of the region are moved/changed. Thus, for example, if a region only covers features A and B, features C and D remain constant for all points moving into the region.

According to some embodiments, scenario simulation 420 may be performed by, but not limited to, point sampling, kernel density estimation sampling, univariate sampling, multivariate sampling, augmentation, instance likelihood and HDB Scan, and the like, or some combination thereof.

For example, point sampling mechanisms may be performed, whereby for each point outside of a region, engine 140 may randomly sample a point inside the region and replace the features that define the region. For example, for a point X=(x1, x2, x3, x4) to move into region A covering features 1 and 2, point X* is sampled, where point X*=(x1*, x2*, x3*, x4*), and X=(x1*, x2*, x3, x4).

Figure 9:
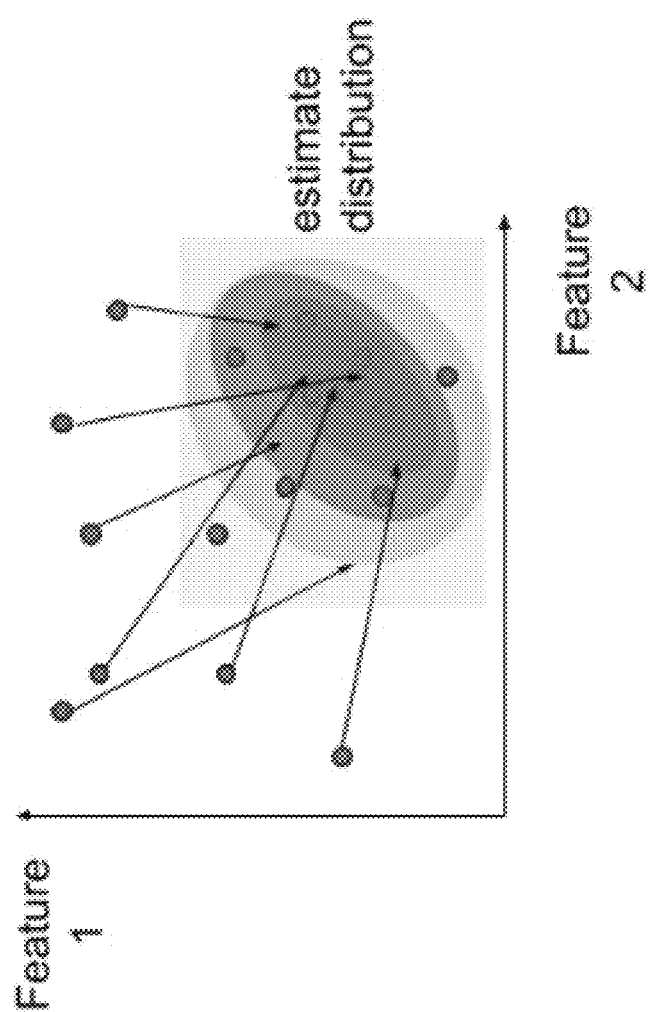
FIG. 9 depicts a non-limiting example of sampling for a simulation performed in accordance with one or more embodiments of the present disclosure.

By way of another example, kernel density estimation (KDE) sampling may involve estimating a joint distribution of points inside region A with KDE, considering only features represented by A; and then, sample from distribution. An example of this is depicted in FIG. 9.

For example, for a point X=(x1, x2, x3, x4) to move into region A, covering features 1 and 2, engine 140 may perform KDE by estimating joint density P(x1, x2|A), then sampling a point (x1*, x2*); then, X→(x1*, x2*, x3, x4).

According to some embodiments, engine 140 may perform univariate sampling by estimating, for each feature constrained by the region, a univariate distribution of the points inside the region along that feature. Then, engine 140 may independently sample features from those distributions to replace the features of the point X we want to move.

In some embodiments, engine 140 may perform multivariate sampling. In some embodiments, multivariate sampling may be similar to univariate sampling; however, engine 140 estimates the joint density P(F1, F2, F3|R) for all features F1, F2, F3, and the like. described by the region R. In some embodiments, this may be performed by using kernel density estimation.

In some embodiments, engine 140 may perform augmentation by sampling only a single point for each point to be moved. In some embodiments, for each point, the expected value, of the prediction if we had moved that point into the region, is determined. In some embodiments, to simulate this engine 140 may augment the array of points to move by duplicating points. That is, suppose point X is desired to move into a region R— engine 140 may create multiple copies of X X1, X2, X3 . . . all identical to X, then independently sample new points to move into R for each of the copies.

In some embodiments, engine 140 may perform instance likelihood and HDBScan by determining how likely it is that the point is in the actual data. Such determination of likelihood may be performed via HDB Scan. If the determined likelihood is at or below a threshold, then that point may be removed from consideration. In some embodiments, the threshold corresponds to a percentile of points within a dataset (e.g., 95% of data within dataset 401, for example).

Upon the scenario simulation 420 analysis being performed by engine 140, the output data is processed via a region evaluation 430 processing. According to some embodiments, region evaluation 430 involves determining, based on the output from scenarios simulation 420 processing, the candidate regions 411 data and simulated scenarios 421 data, which can then be provided to the component for region evaluation metrics 412 (e.g., determine region evaluation metrics 412 based on simulated scenarios 421 data and candidate regions 411 data). Accordingly, region evaluation metrics 412 may then be utilized for the performance of a rank aggregation 432.

According to some embodiments, once a region is simulated, engine 140 may score that scenario according to s specified list of metrics—region evaluation metrics 412. According to some embodiments, such metrics may include, but are not limited to, average model output change, number of points inside a region, number of points outside a region, area of region, volume of region, inverse distance needed to move points inside a region (e.g., which may be weighted dependent upon a distance (e.g., more weight applied points with less distance to move, for example)), percentage of points which changed by significant amount, and the like, or some combination thereof.

Accordingly, these metrics are then tabulated for each region, and then each region may be ranked, whereby top ranked regions 433 are output/determined. In other words, a ranked listing of regions is compiled. In some embodiments, engine 140 may execute a rank aggregation methodology where a top-k best regions with metric scores satisfying a threshold value are selected/identified (e.g., regions below the threshold are removed to prevent and/or avoid poor performance). For example, engine 140 (e.g., and in some embodiments, rank aggregation 432 component, for example) may implement Fagin's algorithm, which sequentially accesses all lists in parallel until there are k regions that have seen all the lists.

In some embodiments, engine 140 may perform a scenario evaluation 440 on the top ranked regions 433. In some embodiments, engine 140 may display the top ranked regions 433 on a display of a graphical user interface displayed on a device. In some embodiments, the displayed regions may be the selected regions 403. In some embodiments, the selected regions 403 may correspond to the critical scenario 108, as discussed above in relation to FIGS. 1-3. In some embodiments, engine 140's scenario evaluation 440 may involve debugging and/or performing statistical tests on the top ranked regions 433.

In some embodiments, debugging may involve further analyzing the regions, and included points, within top ranked regions 433 to confirm and/or verify their ranking. In some embodiments, such further analysis may involve re-performance of any of the preceding analysis of FIG. 4 (e.g., region proposal, region pre-processing, scenario simulation, region evaluation, and the like, or some combination thereof.

In some embodiments, statistical testing, which may be a part of the debugging, may involve comparing a population of model predictions outside of a region versus a model prediction inside a region, and if they differ more than a threshold value (or at all), a higher score is provided. In some embodiments, such processing may be performed by engine 140 executing mechanisms involving, but not limited to, a Wilcoxon test, Bhapkar marginal homogeneity test, and/or any other type of known or to be known regression and/or rank-sum testing algorithm. In some embodiments, such testing is performed for each region in top ranked regions 433. In some embodiments, if a score is at or above a threshold, that region may be discarded and the rank aggregation 432 may be retabulated without the discarded region(s).

Figure 10:
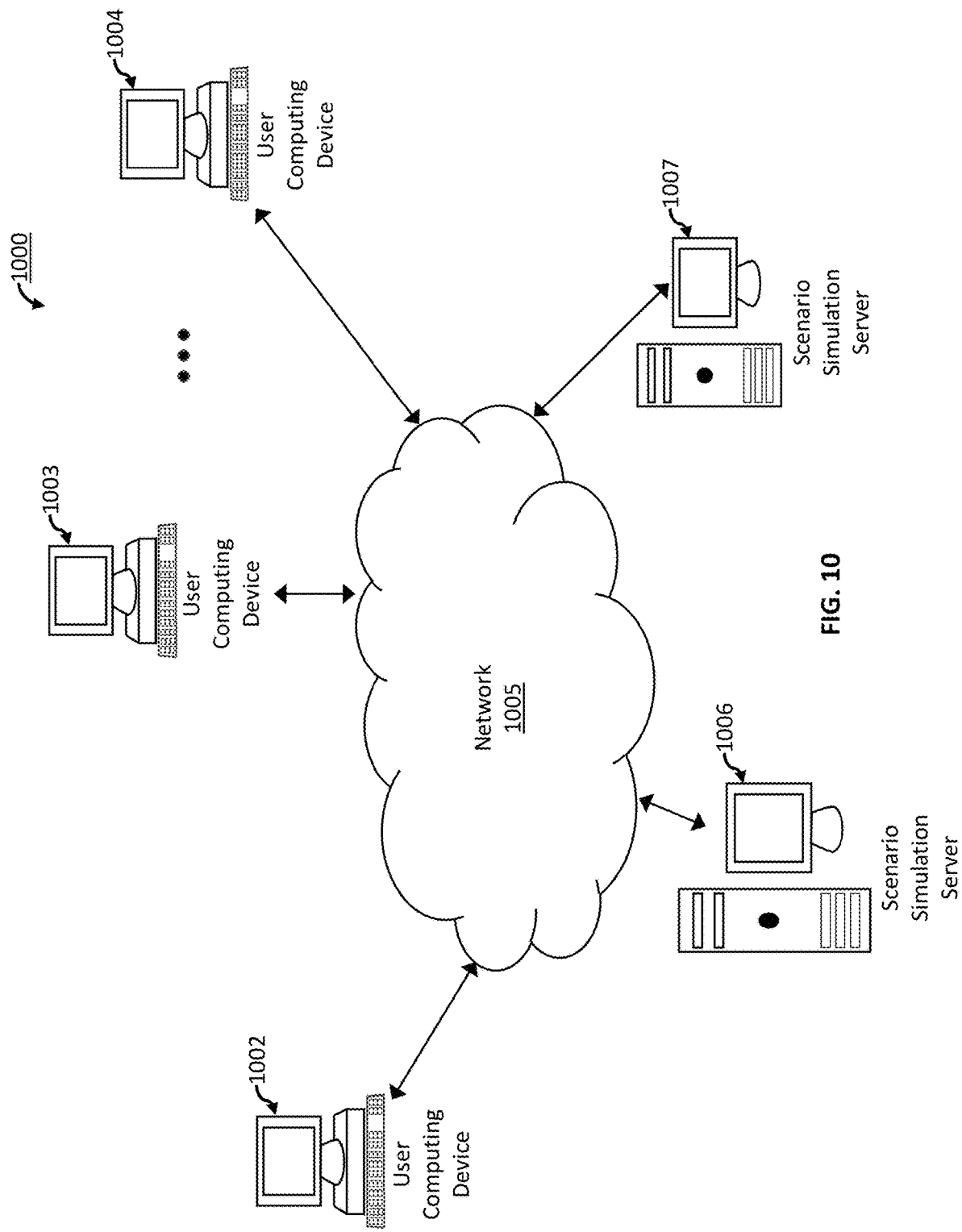
FIG. 10 depicts a block diagram of a computer-based system and platform for simulating and recognizing scenarios of feature variation in accordance with one or more embodiments of the present disclosure.

FIG. 10 depicts a block diagram of a computer-based system and platform 1000 for simulating and recognizing scenarios of feature variation in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the computer-based system and platform 1000 may be configured to manage a large number of members and concurrent transactions, as detailed herein. In some embodiments, the computer-based system and platform 1000 may be based on a scalable computer and network architecture that incorporates varies strategies for assessing the input records, caching, searching, and/or database connection pooling. An example of the scalable architecture is an architecture that is capable of operating multiple servers.

In some embodiments, referring to FIG. 10, user computing device 1002, user computing device 1003 through user computing device 1004 (e.g., user computing devices) of the computer-based system and platform 1000 may include virtually any computing device capable of receiving and sending a message over a network (e.g., cloud network) and displaying the scenario planning interface 102, such as network 1005, to and from another computing device, such as scenario simulation servers 1006 and 1007, each other, and the like. In some embodiments, the user computing devices 1002-1004 may be personal computers, multiprocessor systems, microprocessor-based or programmable consumer electronics, network PCs, and the like. In some embodiments, one or more user computing devices within user computing devices 1002-1004 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more user computing devices within user computing devices 1002-1004 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more user computing devices within user computing devices 1002-1004 may run one or more applications, such as Internet browsers, mobile applications, voice calls, video games, videoconferencing, and email, among others.

In some embodiments, one or more user computing devices within user computing devices 1002-1004 may be configured to receive and to send web pages, and the like. In some embodiments, an specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like in order to display the scenario planning interface 102.

In some embodiments, a user computing device within user computing devices 1002-1004 may be specifically programmed by either Java, .Net, QT, C, C++, Python, PHP and/or other suitable programming language. In some embodiment of the device software, device control may be distributed between multiple standalone applications. In some embodiments, software components/applications may be updated and redeployed remotely as individual units or as a full software suite. In some embodiments, a user computing device may periodically report status or send alerts over text or email. In some embodiments, a user computing device may contain a data recorder which is remotely downloadable by the user using network protocols such as FTP, SSH, or other file transfer mechanisms. In some embodiments, a user computing device may provide several levels of user interface, for example, advance user, standard user. In some embodiments, one or more user computing devices within user computing devices 1002-1004 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the network 1005 may provide network access, data transport and/or other services to any computing device coupled to it. In some embodiments, the network 1005 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the network 1005 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the network 1005 may include and implement, as an alternative or in conjunction with one or more of the above, a WiMAX architecture defined by the WiMAX forum. In some embodiments and, optionally, in combination of any embodiment described above or below, the network 1005 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the network 1005 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the network 1005 may also include mass storage, such as network attached storage (NAS), a storage area network (SAN), a content delivery network (CDN) or other forms of computer or machine readable media.

In some embodiments, the scenario simulation server 1006 or the scenario simulation server 1007 may be a web server (or a series of servers) running a network operating system, examples of which may include but are not limited to Apache on Linux or Microsoft IIS (Internet Information Services). In some embodiments, the scenario simulation server 1006 or the scenario simulation server 1007 may be used for and/or provide cloud and/or network computing, including instantiating, executing, and serving results from the variation generation engine 120, the machine learning model engine 130 and the critical scenario engine 140 of the critical scenario detection system 110. Although not shown in FIG. 10, in some embodiments, the scenario simulation server 1006 or the scenario simulation server 1007 may have connections to external systems like email, SMS messaging, text messaging, ad content providers, etc. Any of the features of the server 1006 may be also implemented in the server 1007 and vice versa.

In some embodiments, one or more of the scenario simulation servers 1006 and 1007 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the user computing devices 1001-1004.

In some embodiments and, optionally, in combination of any embodiment described above or below, for example, one or more of the user computing devices 1002-1004, the scenario simulation server 1006, and/or the scenario simulation server 1007 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 11:
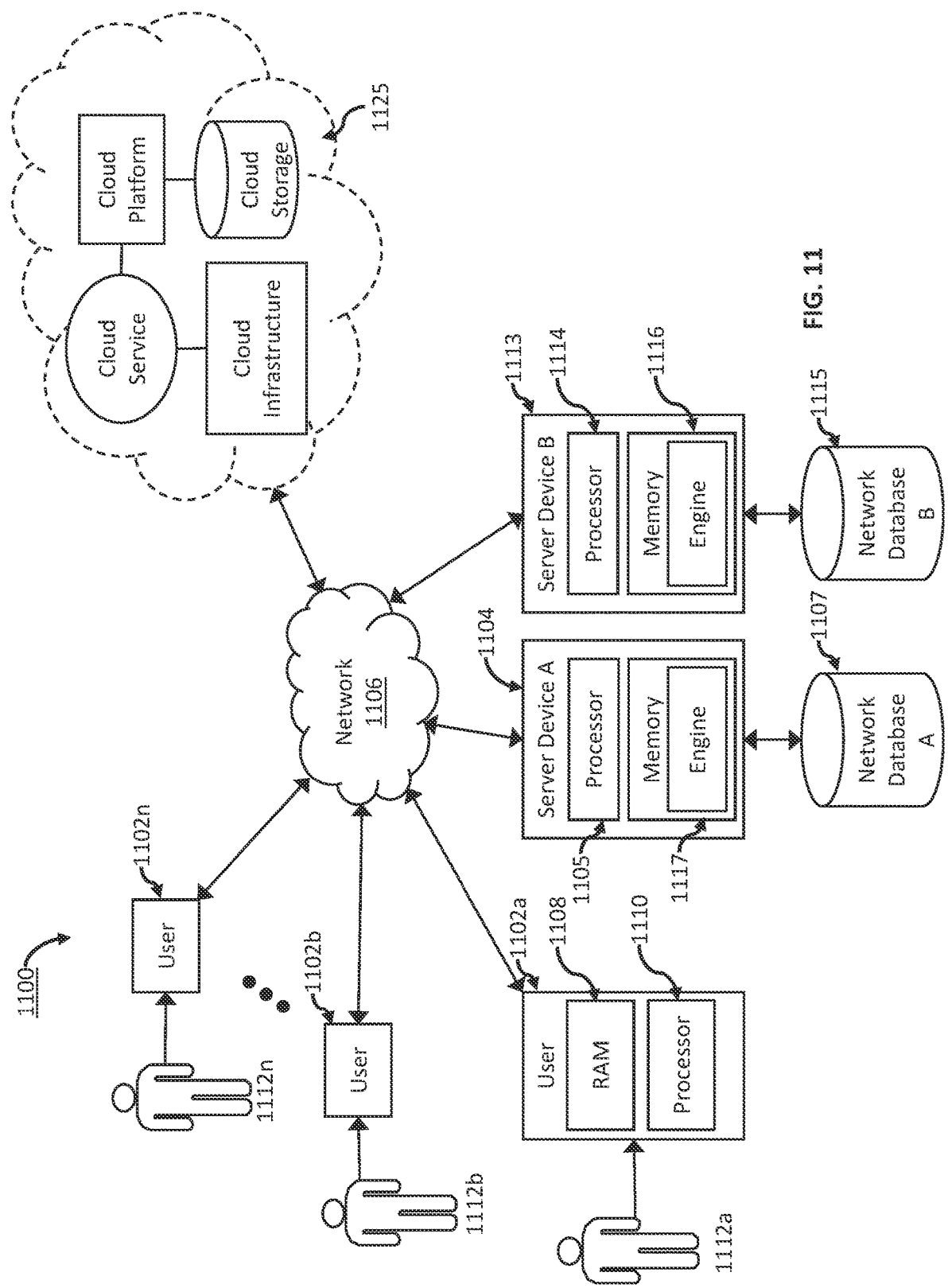
FIG. 11 depicts a block diagram of another computer-based system and platform for simulating and recognizing scenarios of feature variation in accordance with one or more embodiments of the present disclosure.

FIG. 11 depicts a block diagram of another computer-based system and platform 1100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the user computing device 1102a, user computing device 1102b through user computing device 1102n shown each at least includes a computer-readable medium, such as a random-access memory (RAM) 1108 coupled to a processor 1110 or FLASH memory. In some embodiments, the processor 1110 may execute computer-executable program instructions stored in memory 1108. In some embodiments, the processor 1110 may include a microprocessor, an ASIC, and/or a state machine. In some embodiments, the processor 1110 may include, or may be in communication with, media, for example computer-readable media, which stores instructions that, when executed by the processor 1110, may cause the processor 1110 to perform one or more steps described herein. In some embodiments, examples of computer-readable media may include, but are not limited to, an electronic, optical, magnetic, or other storage or transmission device capable of providing a processor, such as the processor 1110 of user computing device 1102a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor may read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, user computing devices 1102*a* through 1102*n* may also comprise a number of external or internal devices such as a mouse, a CD-ROM, DVD, a physical or virtual keyboard, a display, or other input or output devices. In some embodiments, examples of user computing devices 1102*a* through 1102*n* (e.g., user computing devices) may be any type of processor-based platforms that are connected to a network 1106 and send requests and/or receive results of the critical scenario detection system 110 to present on the scenario planning interface 102, such as, without limitation, personal computers, digital assistants, personal digital assistants, smart phones, pagers, digital tablets, laptop computers, Internet appliances, and other processor-based devices.

In some embodiments, user computing devices 1102*a* through 1102*n* may be specifically programmed with one or more application programs in accordance with one or more principles/methodologies detailed herein. In some embodiments, user computing devices 1102*a* through 1102*n* may operate on any operating system capable of supporting a browser or browser-enabled application, such as Microsoft™, Windows™, and/or Linux. In some embodiments, user computing devices 1102*a* through 1102*n* shown may include, for example, personal computers executing a browser application program such as Microsoft Corporation's Internet Explorer™ Apple Computer, Inc.'s Safari™, Mozilla Firefox, and/or Opera. In some embodiments, through the user computing devices 1102*a* through 1102*n*, one or more of the user 1112*a*, user 1112*b* through user 1112*n*, may communicate over the network 1106 with each other and/or with other systems and/or devices coupled to the network 1106.

As shown in FIG. 11, server device A 1104 and server device B 1113 may include processor 1105 and processor 1114, respectively, as well as memory 1117 and memory 1116, respectively. In some embodiments, the server device A 1104 and server device B 1113 may be also coupled to the network 1106. In some embodiments, one or more user computing devices 1102*a* through 1102*n* may be mobile user computing devices.

In some embodiments, the server device A 1104 and server device B 1113 may include, e.g., a memory 1117 and memory 1116, respectively, storing instructions for one or more engines of the critical scenario detection system 110. For example, server device A 1104 may be configured to implement one or more of the variation generation engine 120, the machine learning model engine 130 and/or the critical scenario engine 140 of the critical scenario detection system 110. Similarly, server device B 1113 may be configured to implement one or more of the variation generation engine 120, the machine learning model engine 130 and/or the critical scenario engine 140 of the critical scenario detection system 110. In some embodiments, the variation generation engine 120, the machine learning model engine 130 and/or the critical scenario engine 140 may be distributed across any combination of the server device A 1104, the server device B 1113 and/or any additional server devices. In some embodiments, the distribution may be dynamically instantiated based on, e.g., load balancing, proximity to the requesting user computing device 1102*a* through 1102*n*, or any other suitable orchestration methodology or any combination thereof.

In some embodiments, at least one database of databases 1107 and 1115 may be any type of database suitable for storing, e.g., the variation database 114 and/or the model library 115, including a database managed by a database management system (DBMS). In some embodiments, an DBMS-managed database may be specifically programmed as an engine that controls organization, storage, management, and/or retrieval of data in the respective database. In some embodiments, the DBMS-managed database may be specifically programmed to provide the ability to query, backup and replicate, enforce rules, provide security, compute, perform change and access logging, and/or automate optimization. In some embodiments, the DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the DBMS-managed database may be specifically programmed to define each respective schema of each database in the DBMS, according to a particular database model of the present disclosure which may include a hierarchical model, network model, relational model, object model, or some other suitable organization that may result in one or more applicable data structures that may include fields, records, files, and/or objects. In some embodiments, the DBMS-managed database may be specifically programmed to include metadata about the data that is stored.

Figure 12:
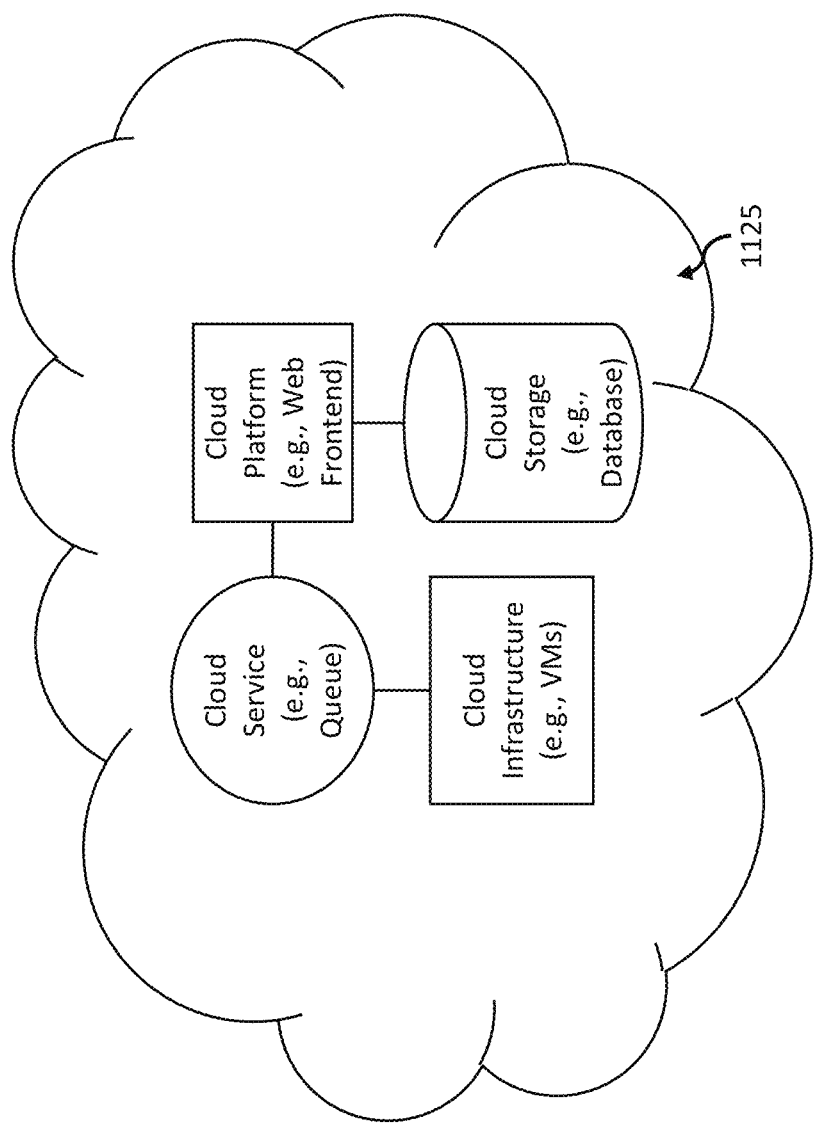
FIG. 12 depicts illustrative schematics of an implementation of the cloud computing/architecture(s) in which embodiments of a system for simulating and recognizing scenarios of feature variation may be specifically configured to operate in accordance with some embodiments of the present disclosure.
Figure 13:
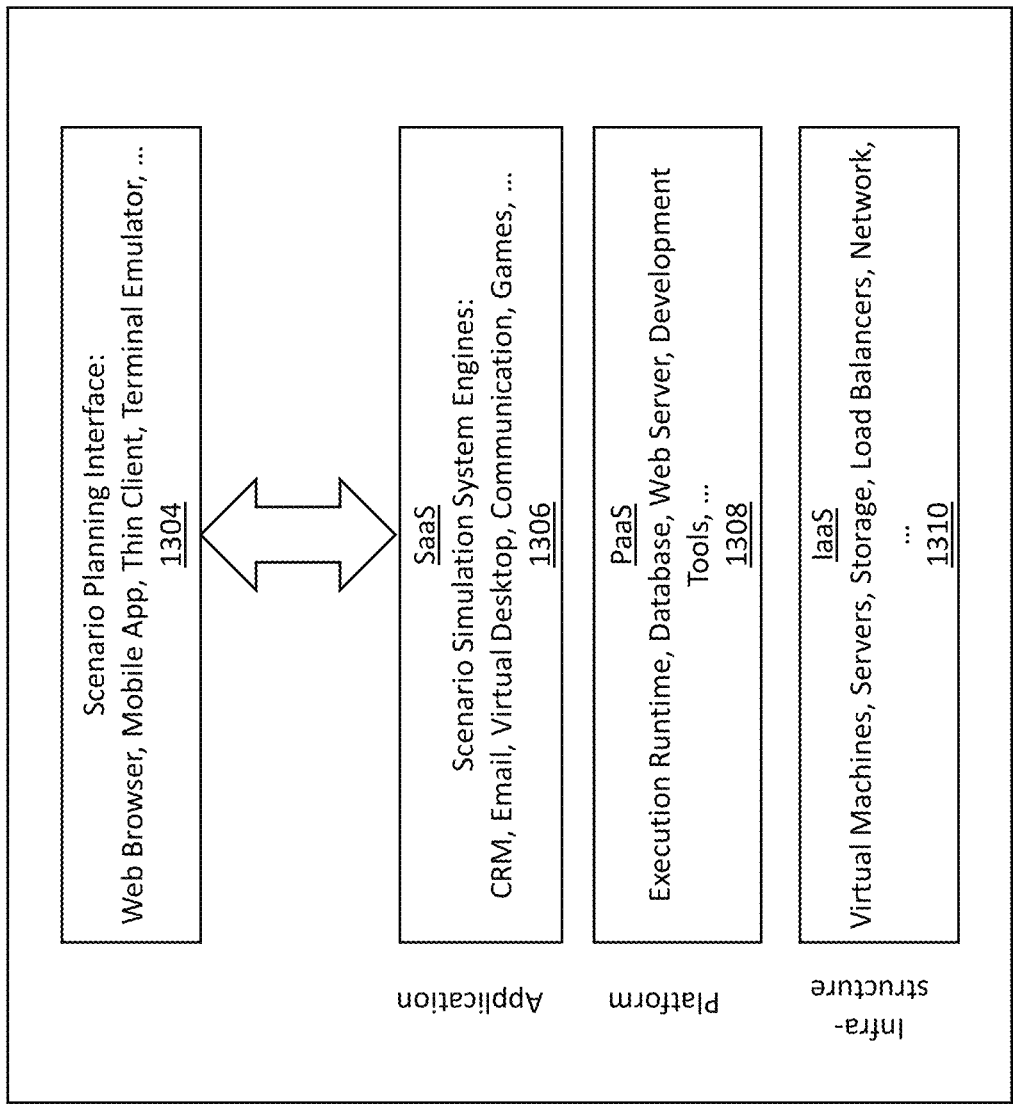
FIG. 13 depicts illustrative schematics of another implementation of the cloud computing/architecture(s) in which embodiments of a system for simulating and recognizing scenarios of feature variation may be specifically configured to operate in accordance with some embodiments of the present disclosure.

In some embodiments, the inventive computer-based systems/platforms, the inventive computer-based devices, and/or the inventive computer-based components of the present disclosure may be specifically configured to operate in a cloud computing/architecture 1125 such as, but not limiting to: infrastructure a service (IaaS) 1310, platform as a service (PaaS) 1308, and/or the critical scenario detection system engines (e.g., the variation generation engine 120, the machine learning model engine 130 and/or the critical scenario engine 140) provided as software as a service (SaaS) 1306 using a scenario planning interface 1304 such as a web browser, mobile app, thin client, terminal emulator or other endpoint presenting the scenario planning interface (e.g., the scenario planning interface 102). FIGS. 12 and 13 illustrate schematics of implementations of the cloud computing/architecture(s) in which the inventive computer-based systems/platforms, the inventive computer-based devices, and/or the inventive computer-based components of the present disclosure may be specifically configured to operate.

It is understood that at least one aspect/functionality of various embodiments of the critical scenario detection system 110 and/or the user computing device 101 described herein may be performed in real-time and/or dynamically. As used herein, the term "real-time" is directed to an event/action that may occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation may be used in guiding the physical process.

As used herein, the term "dynamically" and term "automatically," and their logical and/or linguistic relatives and/or derivatives, mean that certain events and/or actions may be triggered and/or occur without any human intervention. In some embodiments, events and/or actions in accordance with the present disclosure may be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, one or more components and/or functions of the critical scenario detection system 110 and/or the user computing device 101 may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

In some embodiments, the term "server" should be understood to refer to a service point which provides processing, database, and communication facilities of the critical scenario detection system 110 and/or the user computing device 101. By way of example, and not limitation, the term "server" may refer to a single, physical processor with associated communications and data storage and database facilities, or it may refer to a networked or clustered complex of processors and associated network and storage devices, as well as operating software and one or more database systems and application software that support the services provided by the server. Cloud servers are examples.

In some embodiments, as detailed herein, one or more of the critical scenario detection system 110 and/or the user computing device 101 may obtain, manipulate, transfer, store, transform, generate, and/or output any digital object and/or data unit (e.g., from inside and/or outside of a particular application) that may be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

In some embodiments, the critical scenario detection system 110 and may be configured to handle numerous concurrent user computing devices 101 (or user computing device 1002 through 1004, or user computing devices 1102*a* through 1102*n*, or any combination thereof) that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, the critical scenario detection system 110 and/or the user computing device 101 may be configured to output the specifically programmed graphical user interface for the scenario planning interface 102 (e.g., a desktop, a web app., etc.). In various implementations of the present disclosure, a final output (e.g., the variation candidate 106) may be displayed on a displaying screen which may be, without limitation, a screen of user computing device 101. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, the critical scenario detection system 110, as described above, may be implemented as a service delivered by a cloud. As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" may refer to a person who receives data provided by the data or service provider over the Internet in a browser session or may refer to an automated software application which receives the data and stores or processes the data.

The aforementioned examples are, of course, illustrative, and not restrictive.

At least some aspects of the present disclosure will now be described with reference to the following numbered clauses.

1. A method including:
  receiving, by at least one processor, at least one input record;
    where the at least one input record includes a plurality of input features;

iteratively generating, by the at least one processor, at least one test input record including a variation to the plurality of input features of the at least one input record;

iteratively determining, by the at least one processor, an input variation metric indicative of a first degree of variation caused to the at least one input record by the variation to the plurality of input features;

iteratively utilizing, by the at least one processor, a trained machine learning model to generate a at least one output record based at least in part on trained model parameters and the at least one test input record;

iteratively determining, by the at least one processor based on the at least one output record, an output variation metric indicative of a second degree of variation caused to the at least one output record by the variation to the at least one input record by the variation to the plurality of input features;

iteratively storing, in a variation database by the at least one processor:
   the variation to the plurality of input features,
   the input variation metric associated with the variation,
   the at least one output record,
   the output variation metric associated with the variation, and
   where the variation database includes:
      a plurality of preceding variations to the at least one input record,
      a plurality of preceding input variation metrics associated with the plurality of preceding variations and
      a plurality of preceding output variation metrics associated with the plurality of preceding variations;
      a plurality of preceding output records associated with the plurality of preceding output variation metrics;

utilizing, by the at least one processor, an optimization problem to determine at least one candidate input feature of the plurality of input features based at least in part on the variation database;
   where the optimization problem is configured to determine the at least one candidate input feature of the plurality of input features that causes a maximized output variation in the at least one output record in response to a minimized input variation in the at least one input record; and instructing, by the at least one processor, a computing device to present a graphical user interface indicating the at least one candidate input feature, the maximized output variation and the minimized input variation.

2. The method of clause 1, further including:
   iteratively generating, by the at least one processor, the variation to the plurality of input features of the at least one input record based at least in part on a predetermined variation step sequence;
   generating, by the at least one processor, a grid of the at least one test input record and the at least one output record;
   determining, by the at least one processor, the at least one candidate input feature based at least in part on the optimization problem; and
   where the optimization problem includes a grid search algorithm.

3. The method of clause 2, where the grid search algorithm includes a heuristic search.

4. The method of clause 1, further including:
   iteratively determining with the optimization problem, by the at least one processor, an optimization metric based at least in part on the input variation metric associated with the variation, the output variation metric associated with the variation and an objective function;
   iteratively determining with the optimization problem, by the at least one processor, a next variation based at least in part on the optimization metric and the variation; and
   generating, by the at least one processor, a next test input record including the next variation to the plurality of input features of the at least one input record.

5. The method of clause 4, further including iteratively determining with the optimization problem, by the at least one processor, the next variation based at least in part on a gradient descent.

6. The method of clause 4, where the objective function includes minimax.

7. The method of clause 1, further including:
   utilizing, by the at least one processor, the optimization problem to determine an error associated with the at least one output record based at least in part on at least one target outcome;
   iteratively determining with the optimization problem, by the at least one processor, a next variation based at least in part on the error and the variation; and
   generating, by the at least one processor, a next test input record including the next variation to the plurality of input features of the at least one input record.

8. The method of clause 1, further including:
   receiving a dataset corresponding to the plurality of input features;
   analyzing the dataset, and defining, based on the analysis, a plurality of regions, each of the plurality of regions corresponding to a set of identified interval constraints on a subset of the plurality of input features; and
   performing region preprocessing on the defined plurality of regions, the preprocessing including modifying each of the plurality of regions to ensure a particular amount of information is defined within and outside the region.

9. The method of clause 8, where the modification includes at least one of size filtering and region shrinking.

10. The method of clause 8, further including:
   performing, via the trained machine learning model, scenario simulation on the defined plurality of regions, the scenario simulation including manipulating points in and around the region based on a target variable;
   performing, based on the scenario simulation, a ranking aggregation, the ranking aggregation including a determination of a ranked order of the plurality of regions; and
   selecting a subset of the plurality of regions based on the ranked order, where the at least one candidate input feature, the maximized output variation and the minimized input variation are based on the selection.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein may be utilized in any combination with each other. Further still, the various steps may be carried out in any desired order (and any desired steps may be added and/or any desired steps may be eliminated).

What is claimed is:

1. A computer-implemented method comprising:
   receiving, by at least one processor, at least one input record;
   wherein the at least one input record includes a plurality of input features;
   iteratively generating, by the at least one processor, at least one test input record comprising a variation to the plurality of input features of the at least one input record;
   iteratively determining, by the at least one processor, an input variation metric indicative of a first degree of variation caused to the at least one input record by the variation to the plurality of input features;
   iteratively utilizing, by the at least one processor, a trained machine learning model to generate a at least one output record based at least in part on trained model parameters and the at least one test input record;
   iteratively determining, by the at least one processor based on the at least one output record, an output variation metric indicative of a second degree of variation caused to the at least one output record by the variation to the at least one input record by the variation to the plurality of input features;
   iteratively storing, in a variation database by the at least one processor:
      the variation to the plurality of input features,
      the input variation metric associated with the variation,
      the at least one output record,
      the output variation metric associated with the variation, and
   wherein the variation database includes:
      a plurality of preceding variations to the at least one input record,
      a plurality of preceding input variation metrics associated with the plurality of preceding variations and
      a plurality of preceding output variation metrics associated with the plurality of preceding variations;
      a plurality of preceding output records associated with the plurality of preceding output variation metrics;
   utilizing, by the at least one processor, an optimization problem to determine at least one candidate input feature of the plurality of input features based at least in part on the variation database;
      wherein the optimization problem is configured to determine the at least one candidate input feature of the plurality of input features that causes a maximized output variation in the at least one output record in response to a minimized input variation in the at least one input record; and
   instructing, by the at least one processor, a computing device to present a graphical user interface indicating the at least one candidate input feature, the maximized output variation and the minimized input variation;
   receiving, by the at least one processor, a dataset corresponding to the plurality of input features;
   analyzing, by the at least one processor, the dataset, and defining, by the at least one processor, based on the analysis, a plurality of regions, each of the plurality of regions corresponding to a set of identified interval constraints on a subset of the plurality of input features;
   performing region preprocessing on the defined plurality of regions by the at least one processor, the preprocessing comprising modifying each of the plurality of regions to ensure a particular amount of information is defined within and outside the region, wherein the modification comprises at least one of size filtering and region shrinking;
   performing, via the trained machine learning model, scenario simulation on the defined plurality of regions, the scenario simulation comprising manipulating points in and around the region based on a target variable;
   performing, by the at least one processor, based on the scenario simulation, a ranking aggregation, the ranking aggregation comprising a determination of a ranked order of the plurality of regions; and
   selecting, by the at least one processor, a subset of the plurality of regions based on the ranked order, wherein the at least one candidate input feature, the maximized output variation and the minimized input variation are based on the selection.

2. The computer-implemented method of claim 1, further comprising:
   iteratively generating, by the at least one processor, the variation to the plurality of input features of the at least one input record based at least in part on a predetermined variation step sequence;
   generating, by the at least one processor, a grid of the at least one test input record and the at least one output record;
   determining, by the at least one processor, the at least one candidate input feature based at least in part on the optimization problem; and
   wherein the optimization problem includes a grid search algorithm.

3. The computer-implemented method of claim 2, wherein
   the grid search algorithm includes a heuristic search.

4. The computer-implemented method of claim 1, further comprising:
   iteratively determining with the optimization problem, by the at least one processor, an optimization metric based at least in part on the input variation metric associated with the variation, the output variation metric associated with the variation and an objective function;
   iteratively determining with the optimization problem, by the at least one processor, a next variation based at least in part on the optimization metric and the variation; and
   generating, by the at least one processor, a next test input record comprising the next variation to the plurality of input features of the at least one input record.

5. The computer-implemented method of claim 4, further comprising iteratively determining with the optimization problem, by the at least one processor, the next variation based at least in part on a gradient descent.

6. The computer-implemented method of claim 4, where the objective function includes minimax.

7. The computer-implemented method of claim 1, further comprising:
   utilizing, by the at least one processor, the optimization problem to determine an error associated with the at least one output record based at least in part on at least one target outcome;
   iteratively determining with the optimization problem, by the at least one processor, a next variation based at least in part on the error and the variation; and
   generating, by the at least one processor, a next test input record comprising the next variation to the plurality of input features of the at least one input record.

8. A system comprising:
   at least one processor in communication with a non-transitory computer-readable medium having software instructions stored thereon, wherein, upon execution of the software instructions, the at least one processor is configured to:

receive at least one input record;

wherein the at least one input record includes a plurality of input features;

iteratively generate at least one test input record comprising a variation to the plurality of input features of the at least one input record;

iteratively determine an input variation metric indicative of a first degree of variation caused to the at least one input record by the variation to the plurality of input features;

iteratively utilize a trained machine learning model to generate a at least one output record based at least in part on trained model parameters and the at least one test input record;

iteratively determine, based on the at least one output record, an output variation metric indicative of a second degree of variation caused to the at least one output record by the variation to the at least one input record by the variation to the plurality of input features;

iteratively store, in a variation database by the at least one processor:
the variation to the plurality of input features,
the input variation metric associated with the variation,
the at least one output record,
the output variation metric associated with the variation, and
wherein the variation database includes:
a plurality of preceding variations to the at least one input record,
a plurality of preceding input variation metrics associated with the plurality of preceding variations and
a plurality of preceding output variation metrics associated with the plurality of preceding variations;
a plurality of preceding output records associated with the plurality of preceding output variation metrics;

utilize an optimization problem to determine at least one candidate input feature of the plurality of input features based at least in part on the variation database;

wherein the optimization problem is configured to determine the at least one candidate input feature of the plurality of input features that causes a maximized output variation in the at least one output record in response to a minimized input variation in the at least one input record; and instruct a computing device to present a graphical user interface indicating the at least one candidate input feature, the maximized output variation and the minimized input variation;

receive a dataset corresponding to the plurality of input features;

analyze the dataset, and defining, based on the analysis, a plurality of regions, each of the plurality of regions corresponding to a set of identified interval constraints on a subset of the plurality of input features; and perform region preprocessing on the defined plurality of regions, the preprocessing comprising modifying each of the plurality of regions to ensure a particular amount of information is defined within and outside the region;

wherein the modification comprises at least one of size filtering and region shrinking;

perform, via the trained machine learning model, scenario simulation on the defined plurality of regions, the scenario simulation comprising manipulating points in and around the region based on a target variable;

perform, based on the scenario simulation, a ranking aggregation, the ranking aggregation comprising a determination of a ranked order of the plurality of regions; and select a subset of the plurality of regions based on the ranked order, wherein the at least one candidate input feature, the maximized output variation and the minimized input variation are based on the selection.

9. The system of claim 8, wherein the at least one processor is further configured to:
iteratively generate the variation to the plurality of input features of the at least one input record based at least in part on a predetermined variation step sequence;
generate a grid of the at least one test input record and the at least one output record;
determine the at least one candidate input feature based at least in part on the optimization problem; and
wherein the optimization problem includes a grid search algorithm.

10. The system of claim 9, wherein the grid search algorithm includes a heuristic search.

11. The system of claim 8, wherein the at least one processor is further configured to:
iteratively determine with the optimization problem, by the at least one processor, an optimization metric based at least in part on the input variation metric associated with the variation, the output variation metric associated with the variation and an objective function;
iteratively determine with the optimization problem, by the at least one processor, a next variation based at least in part on the optimization metric and the variation; and
generate a next test input record comprising the next variation to the plurality of input features of the at least one input record.

12. The system of claim 11, wherein the at least one processor is further configured to iteratively determine with the optimization problem, by the at least one processor, the next variation based at least in part on a gradient descent.

13. The system of claim 11, where the objective function includes minimax.

14. The system of claim 8, wherein the at least one processor is further configured to:
utilize, by the at least one processor, the optimization problem to determine an error associated with the at least one output record based at least in part on at least one target outcome;
iteratively determine with the optimization problem, by the at least one processor, a next variation based at least in part on the error and the variation; and
generate a next test input record comprising the next variation to the plurality of input features of the at least one input record.

* * * * *